United States Patent [19]
Kitagawa

[11] Patent Number: 5,881,532
[45] Date of Patent: Mar. 16, 1999

[54] CASE PACKER

[75] Inventor: Kazumi Kitagawa, Shiga, Japan

[73] Assignee: Ishida Co., Ltd., Kyoto, Japan

[21] Appl. No.: 847,001

[22] Filed: May 1, 1997

[30]     Foreign Application Priority Data

| May 8, 1996 | [JP] | Japan | 8-139474 |
| May 8, 1996 | [JP] | Japan | 8-139477 |

[51] Int. Cl.$^6$ ............................. B65B 57/10; B65B 35/44
[52] U.S. Cl. ............................ 53/54; 53/251; 53/494; 53/537
[58] Field of Search ............................. 53/495, 494, 493, 53/54, 77, 251, 250, 260, 255, 247, 537, 538

[56]               References Cited

U.S. PATENT DOCUMENTS

| 3,292,341 | 12/1966 | Frost | 53/538 X |
| 3,590,551 | 7/1971 | Riddington et al. | 53/494 |
| 4,776,148 | 10/1988 | Mingozzi | 53/538 X |
| 4,950,016 | 8/1990 | Kumar | 294/64.2 |
| 5,123,231 | 6/1992 | Fallas et al. | 53/493 |
| 5,507,134 | 4/1996 | Takeda et al. | 53/537 X |
| 5,661,949 | 9/1997 | Blanc | 53/495 X |

FOREIGN PATENT DOCUMENTS 2092090   1/1981   United Kingdom.

*Primary Examiner*—James F. Coan
*Attorney, Agent, or Firm*—Majestic, Parsons Siebert & Hsue P.C.

[57]               ABSTRACT

A case packer has a product-supplying mechanism for transporting packaged products sequentially to a product-aligning mechanism including a plurality of conveyors arranged longitudinally towards a packing unit for packing a container with these transported products. The aligning mechanism starts to move intermittently every time a product is delivered from the supplying mechanism so as to sequentially align them. The aligned products are thereafter moved in a continuous motion towards the packing unit. Each conveyor of the aligning mechanism is again caused to move in the same intermittent mode of motion every time the products aligned thereon are discharged therefrom.

14 Claims, 19 Drawing Sheets

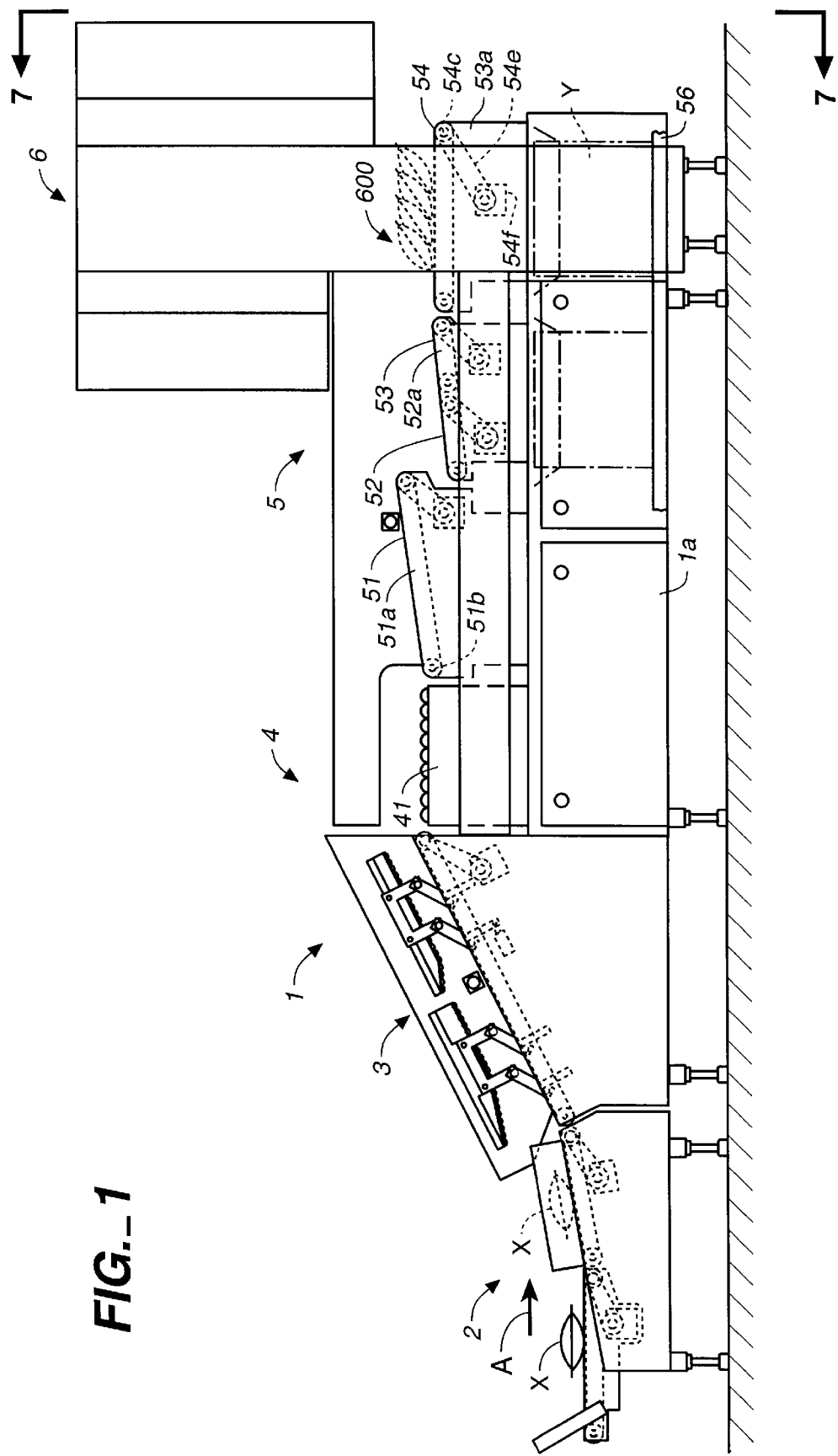
FIG. _1

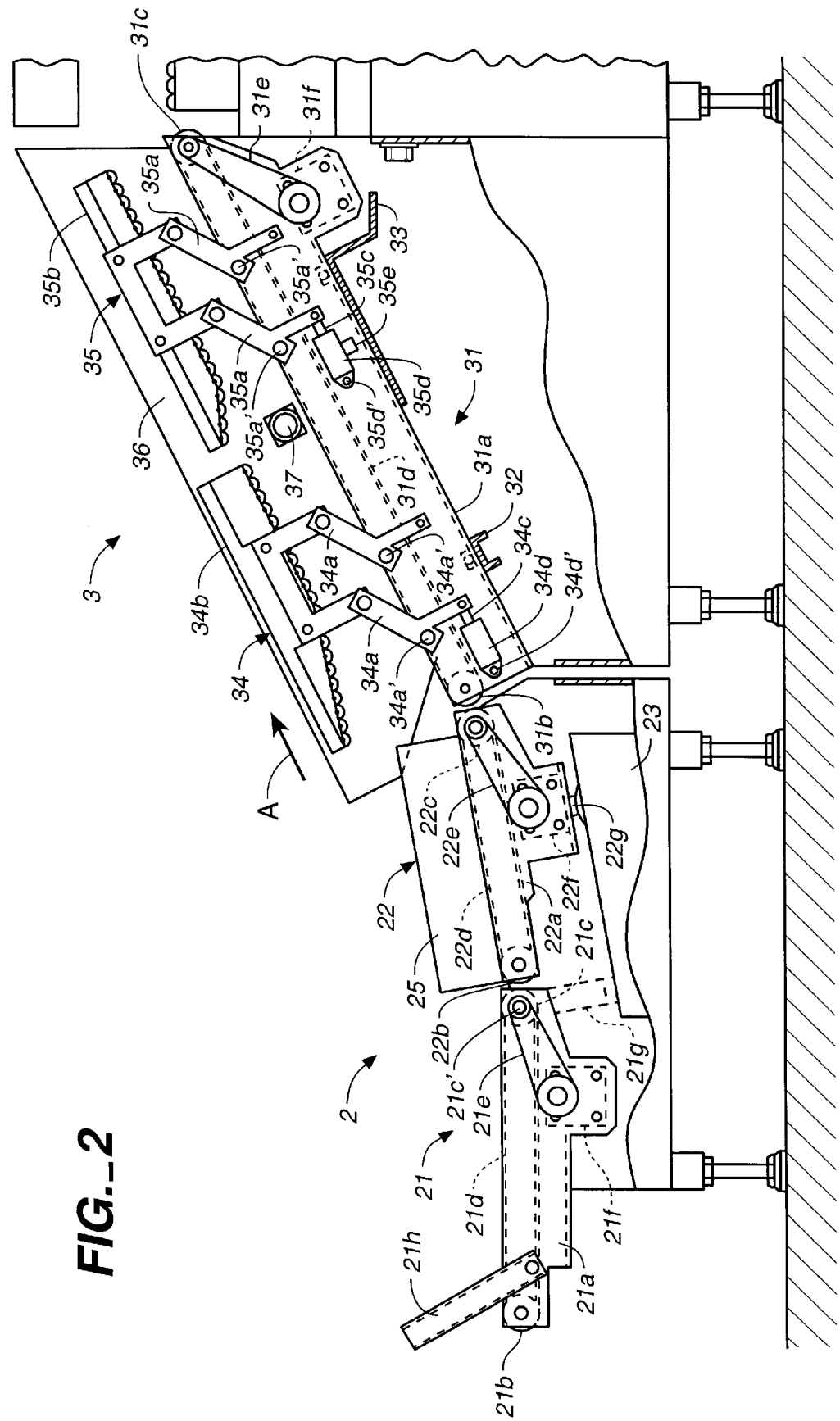
FIG._2

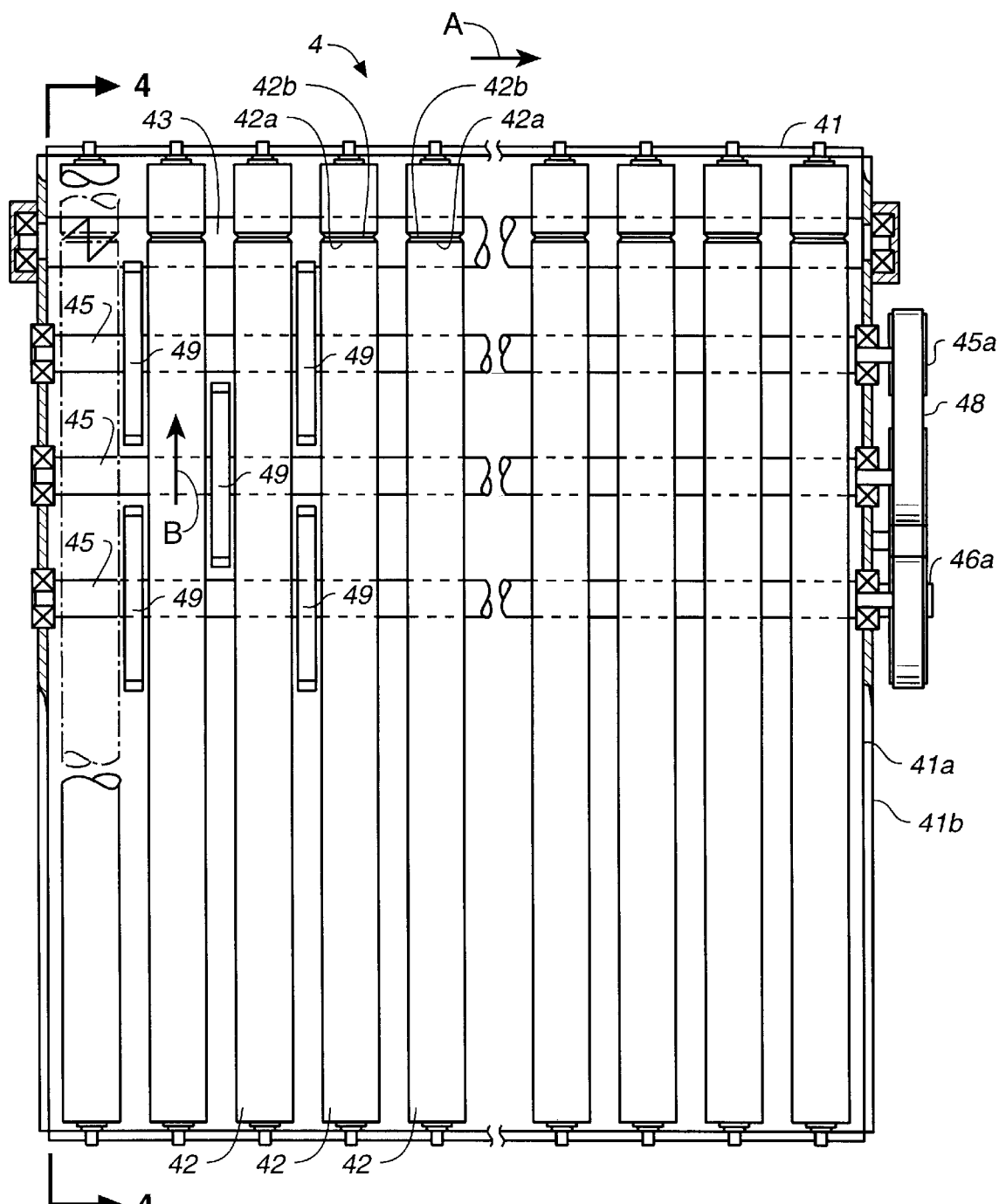
FIG._3

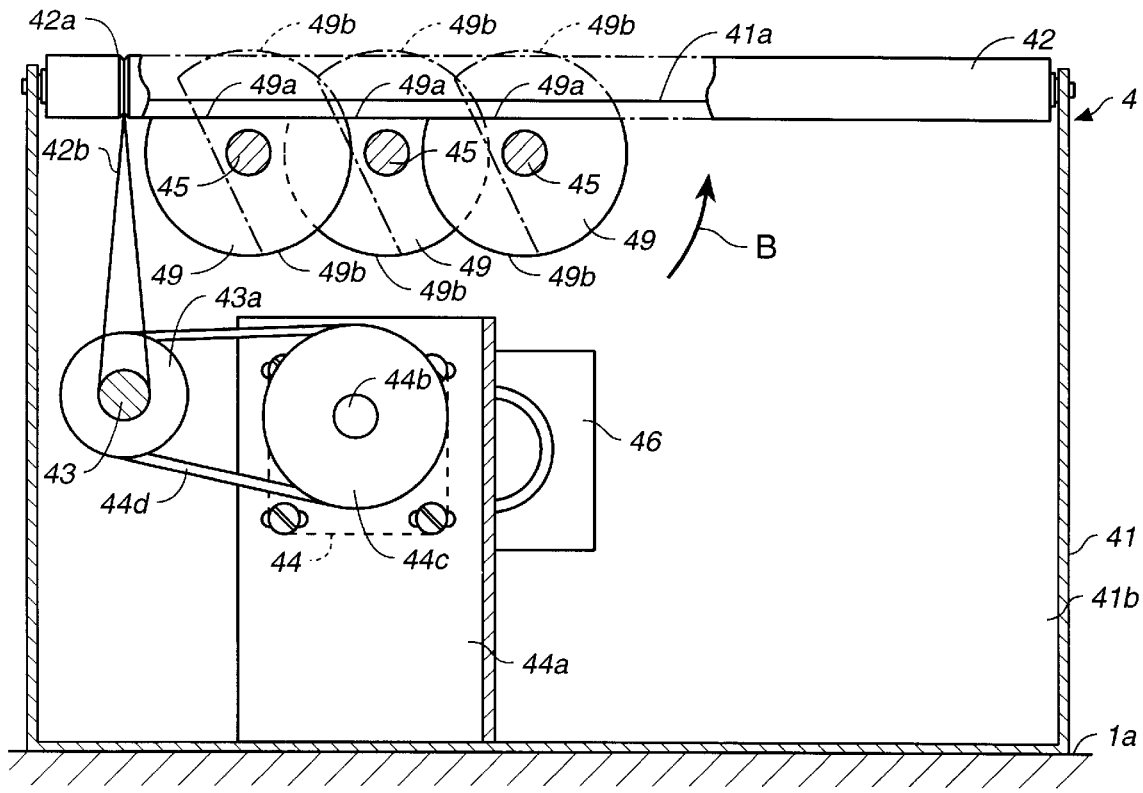
FIG._4
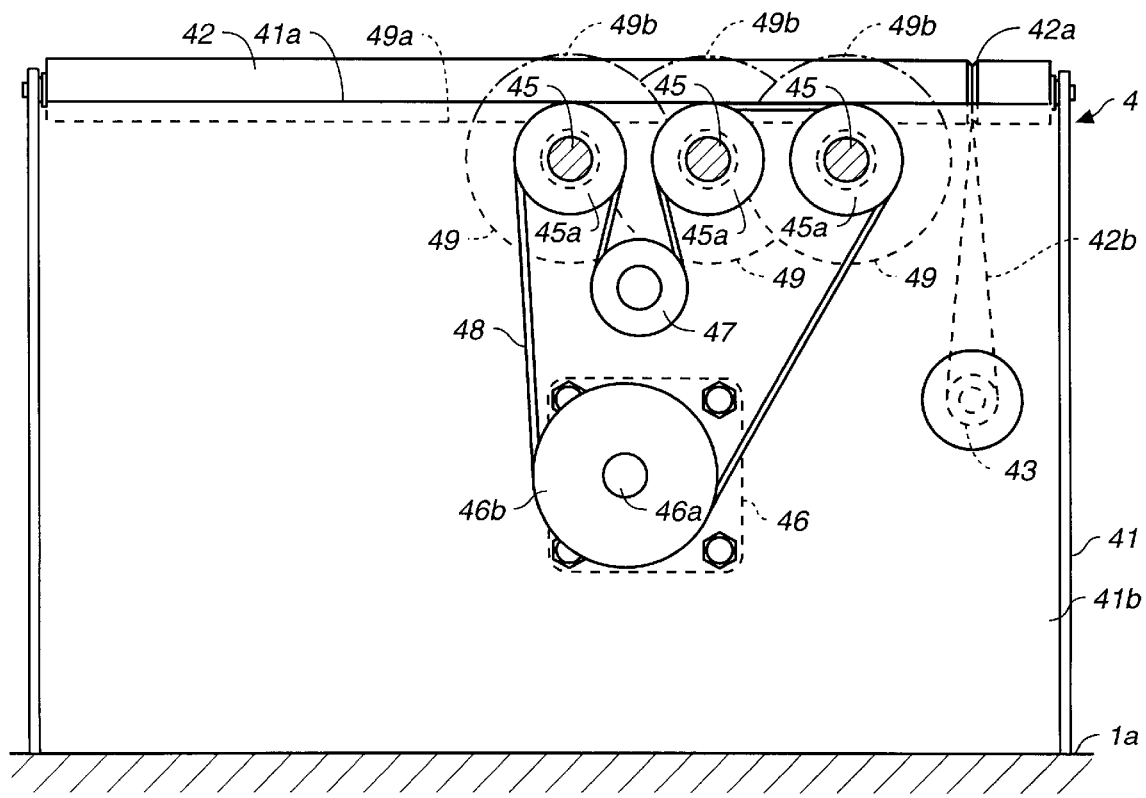
FIG._5

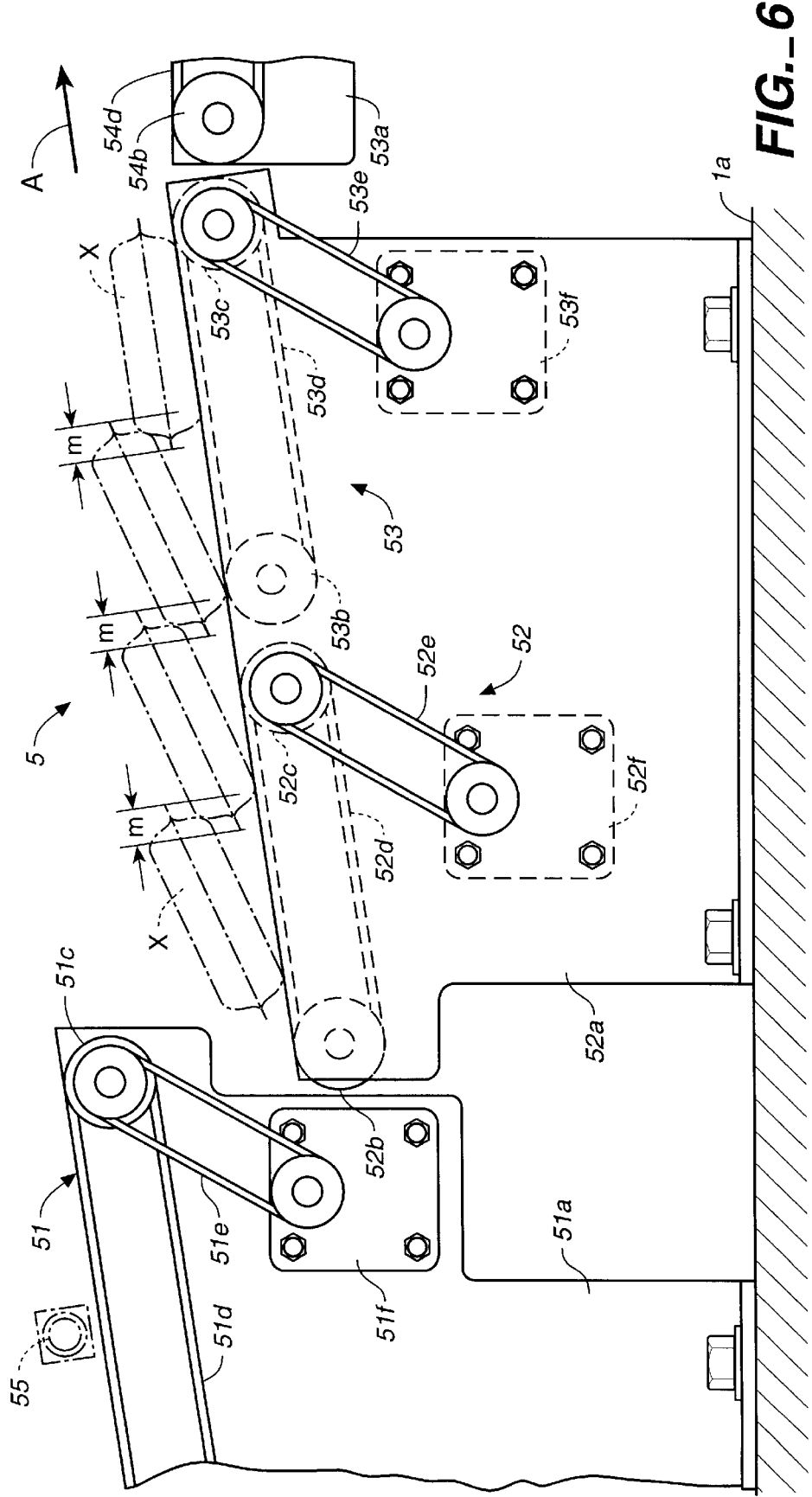
FIG._6

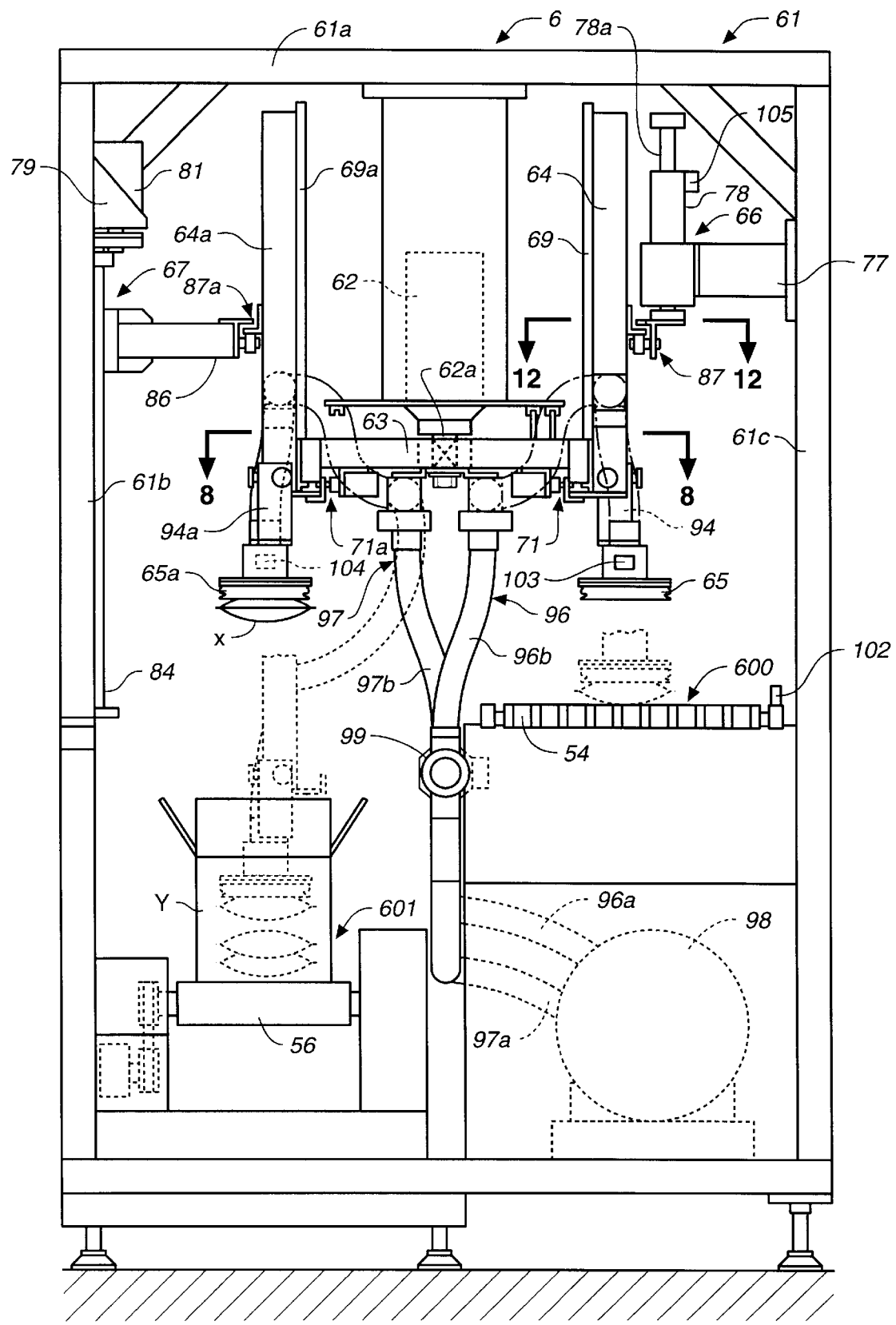
FIG._7

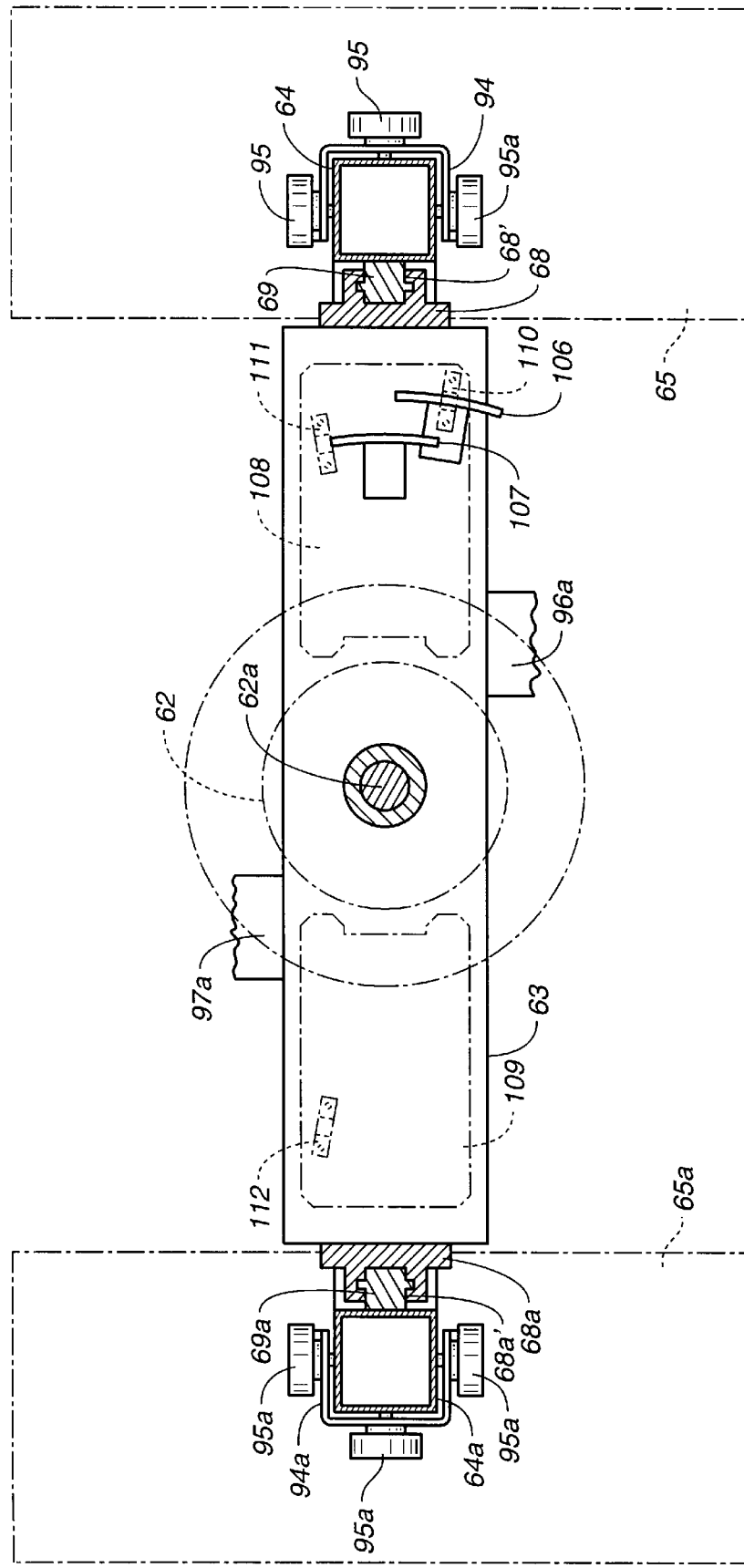
FIG._8

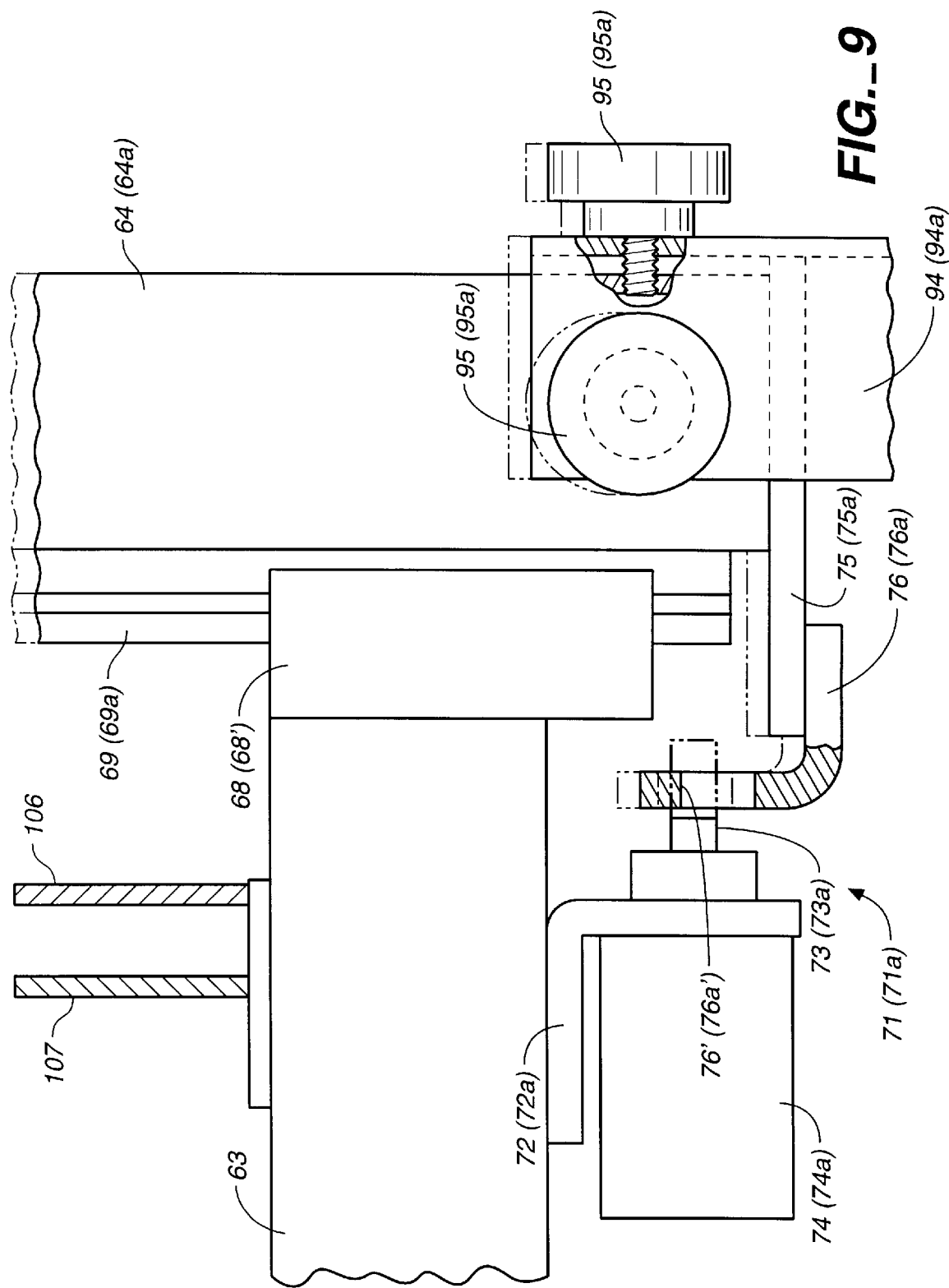

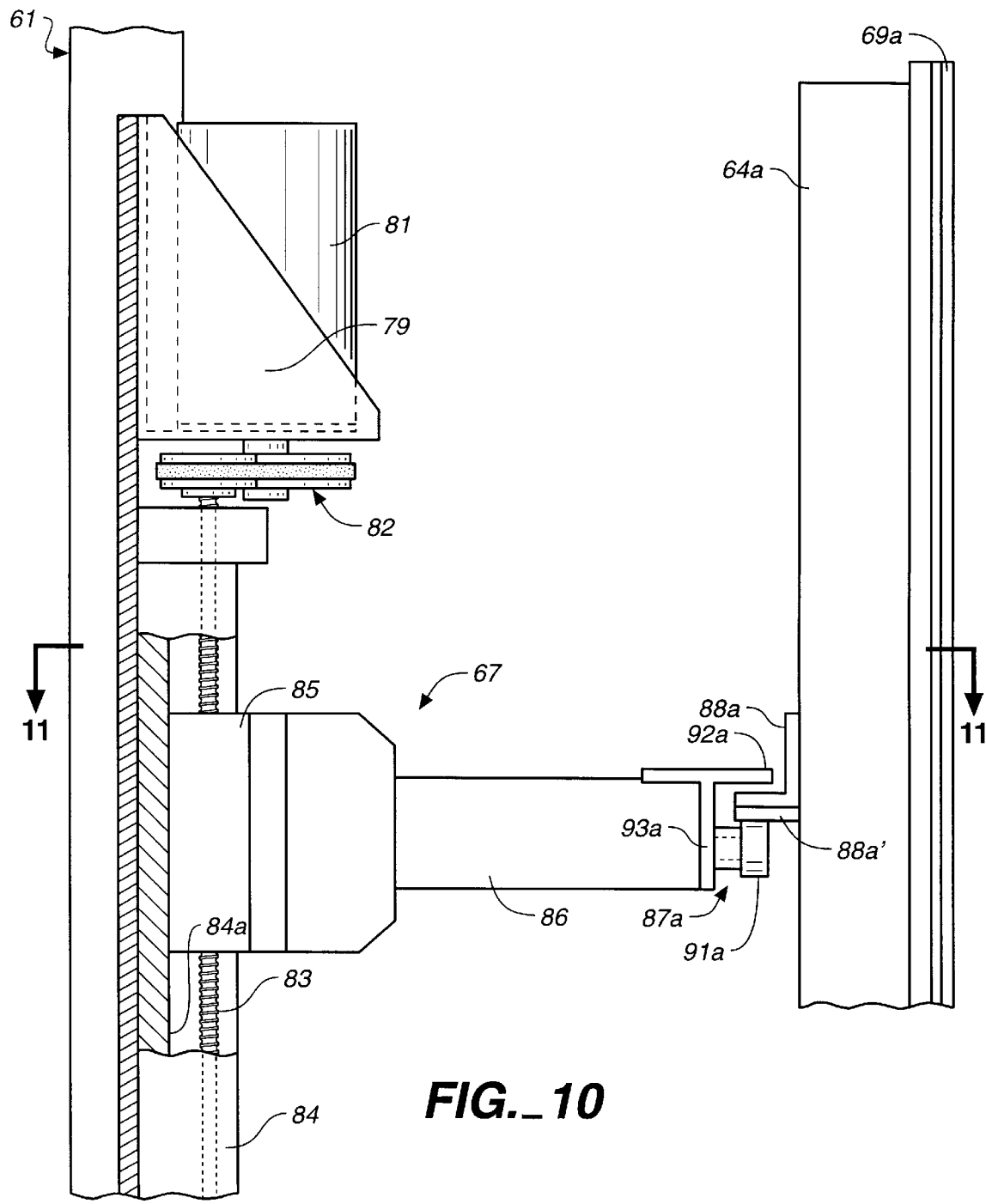
FIG._10

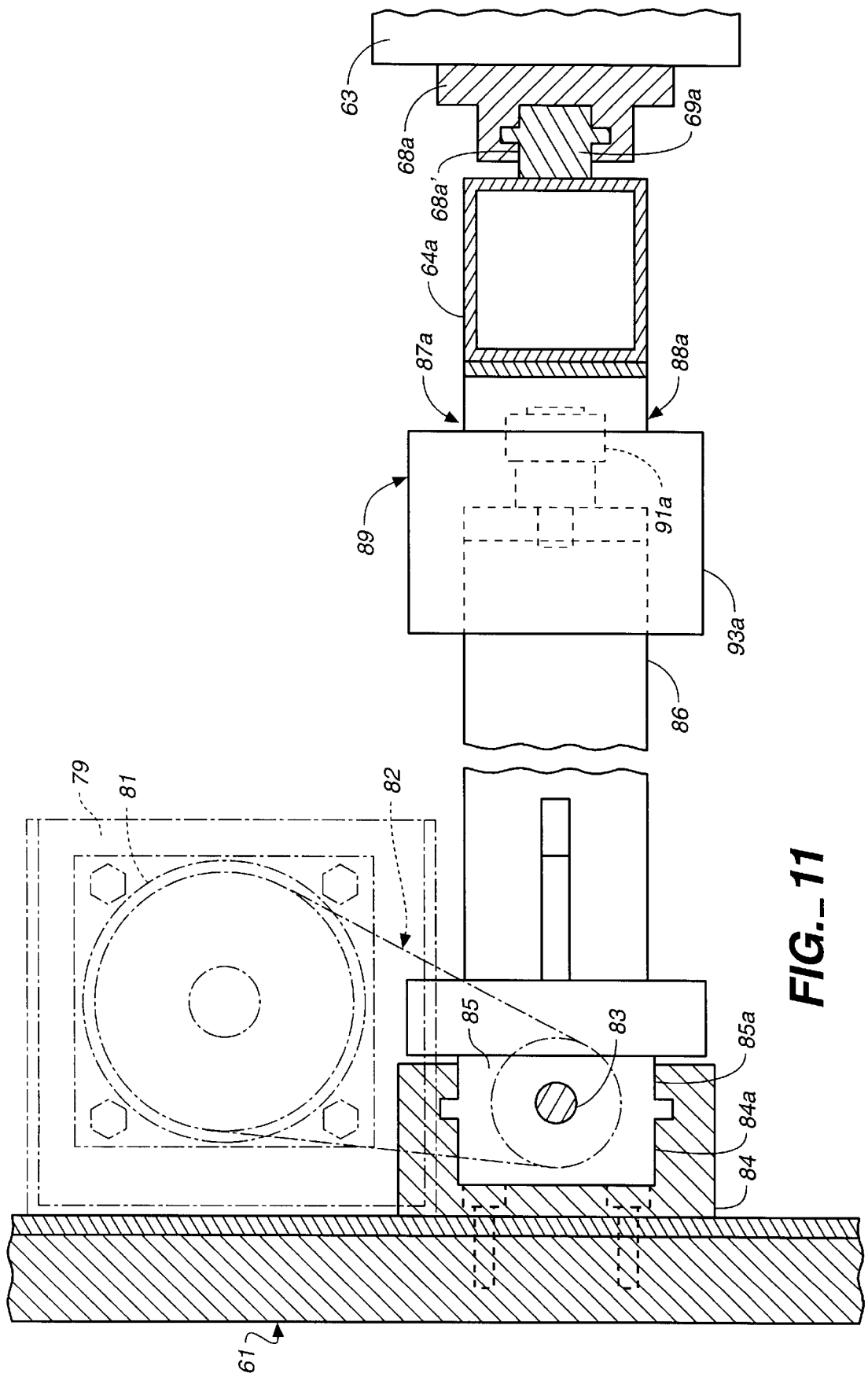
FIG._11

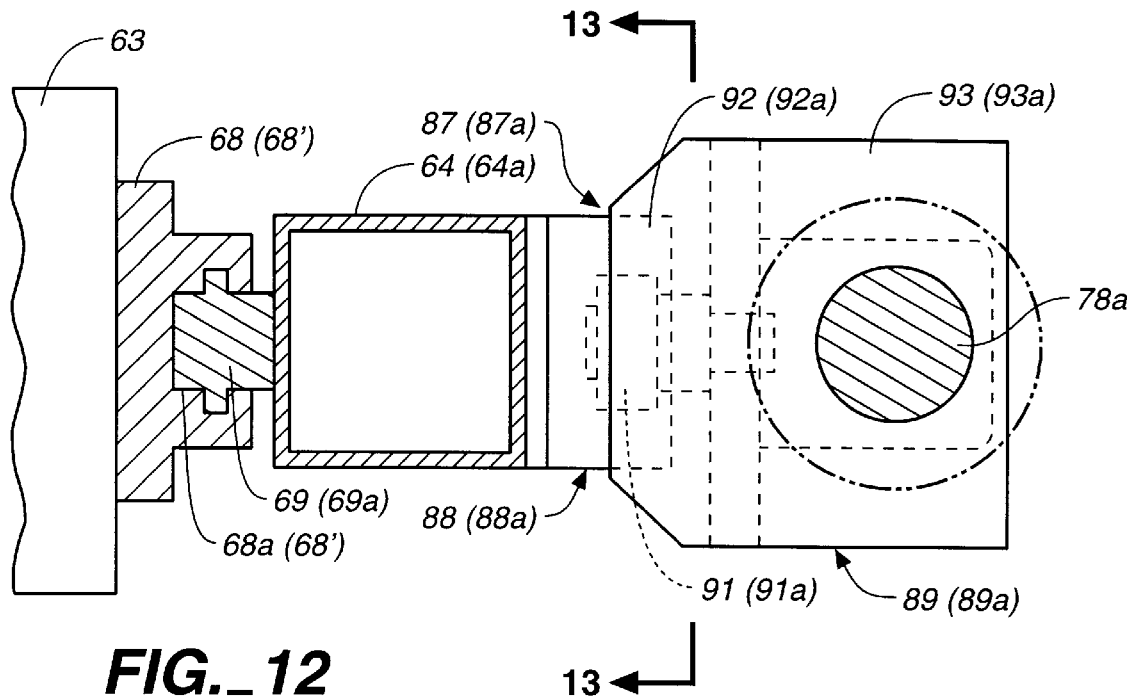
FIG._12
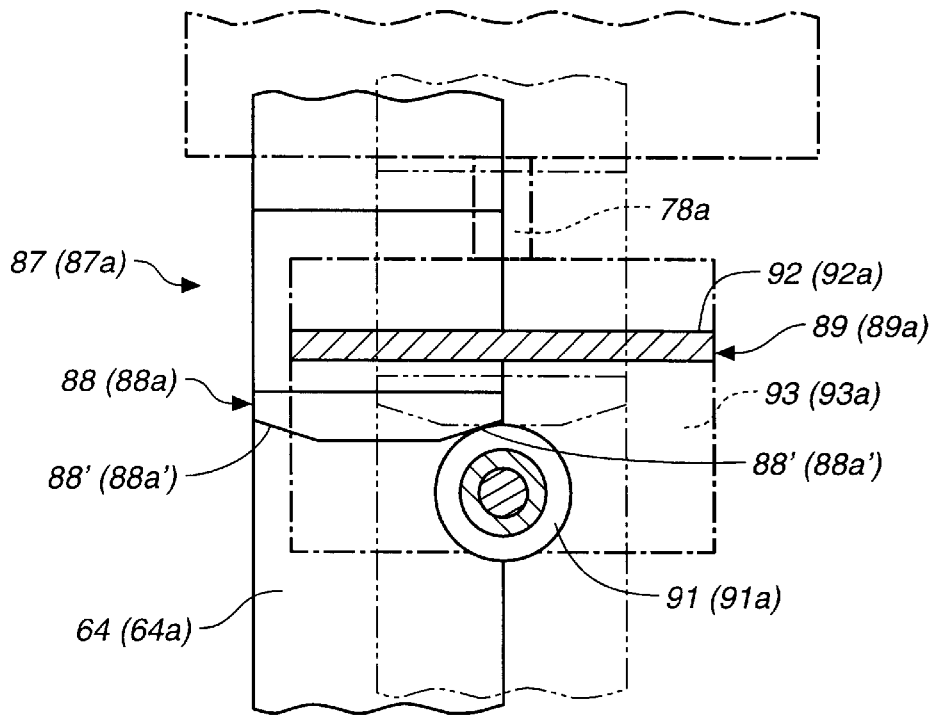
FIG._13

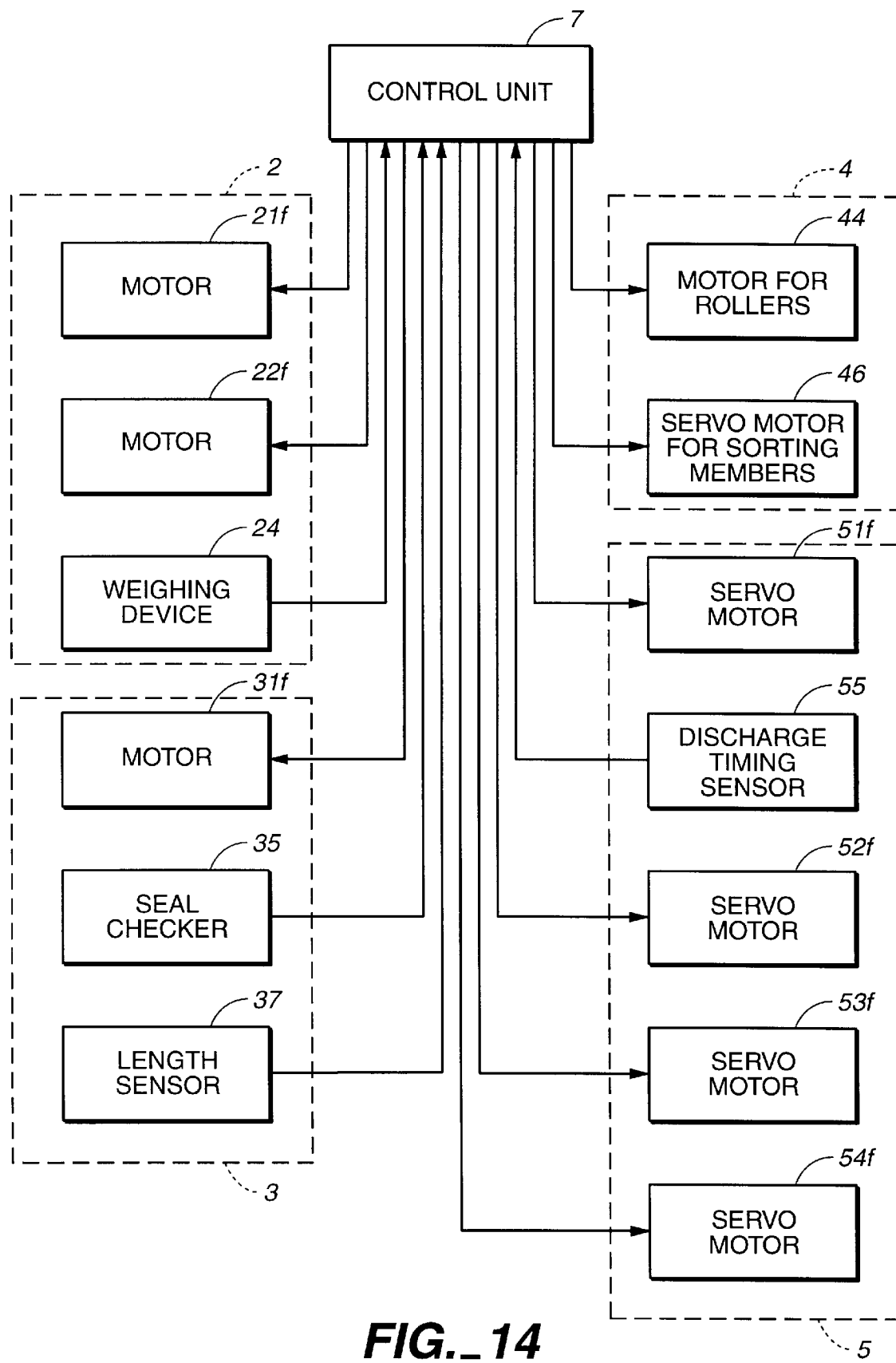
FIG._14

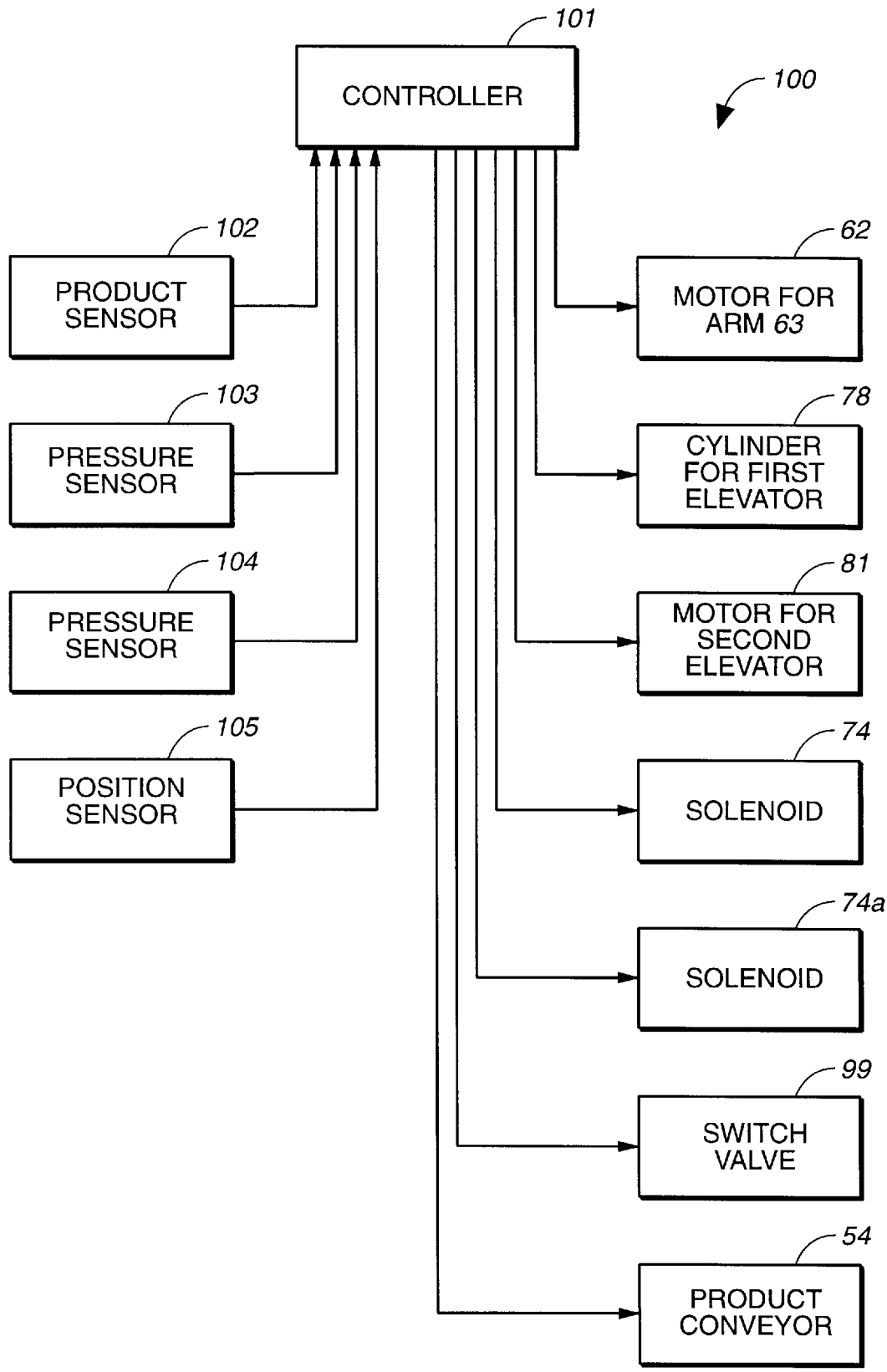
FIG._15

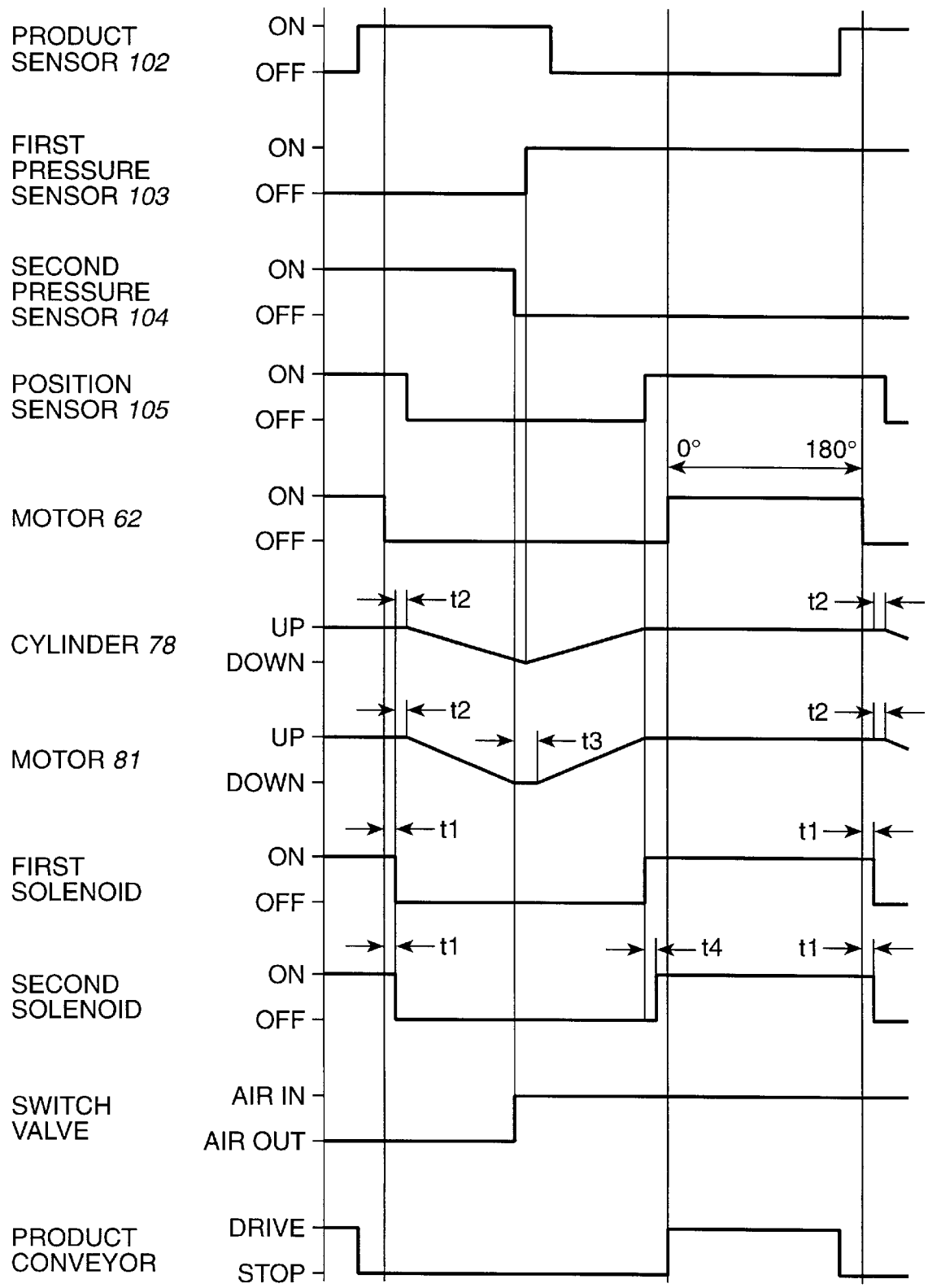
FIG._16

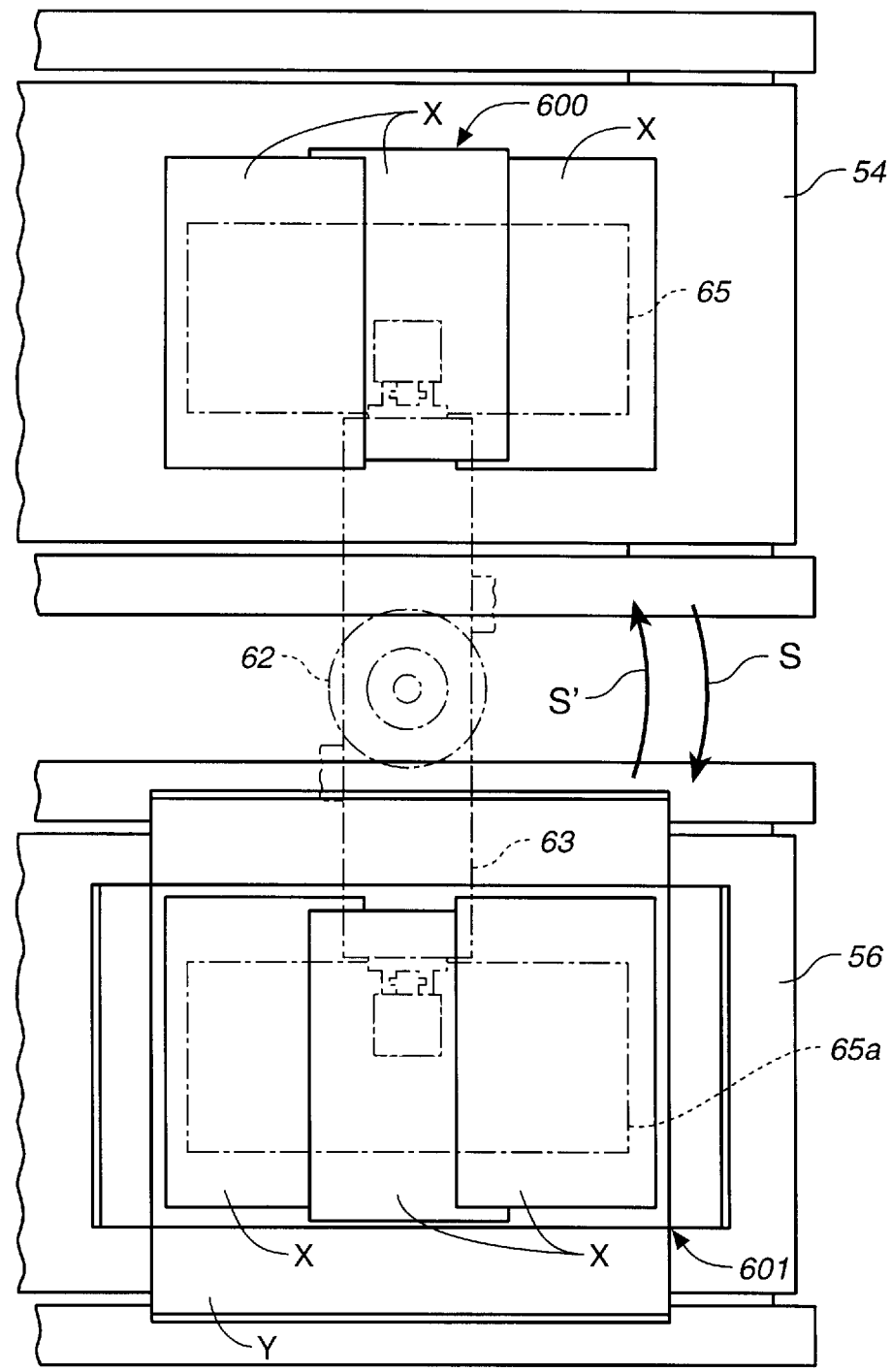
FIG._17

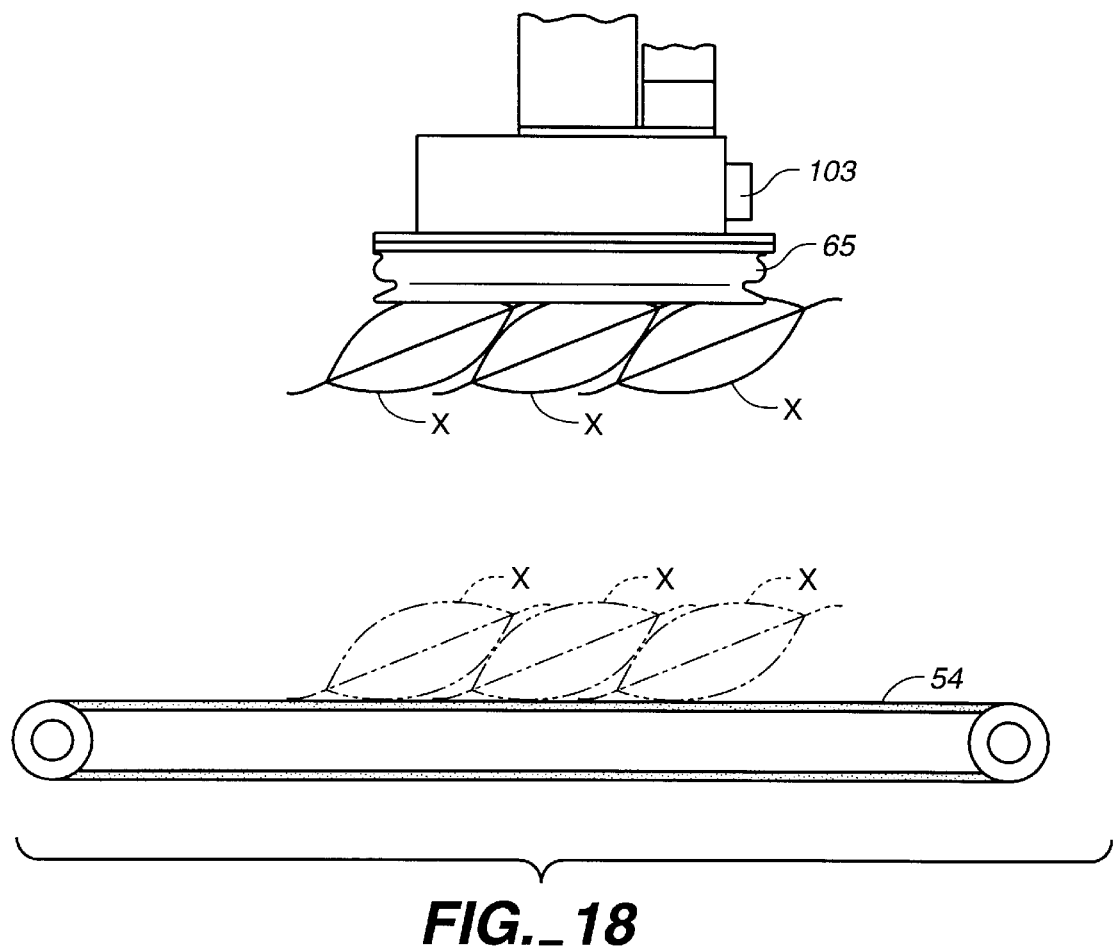
FIG._18
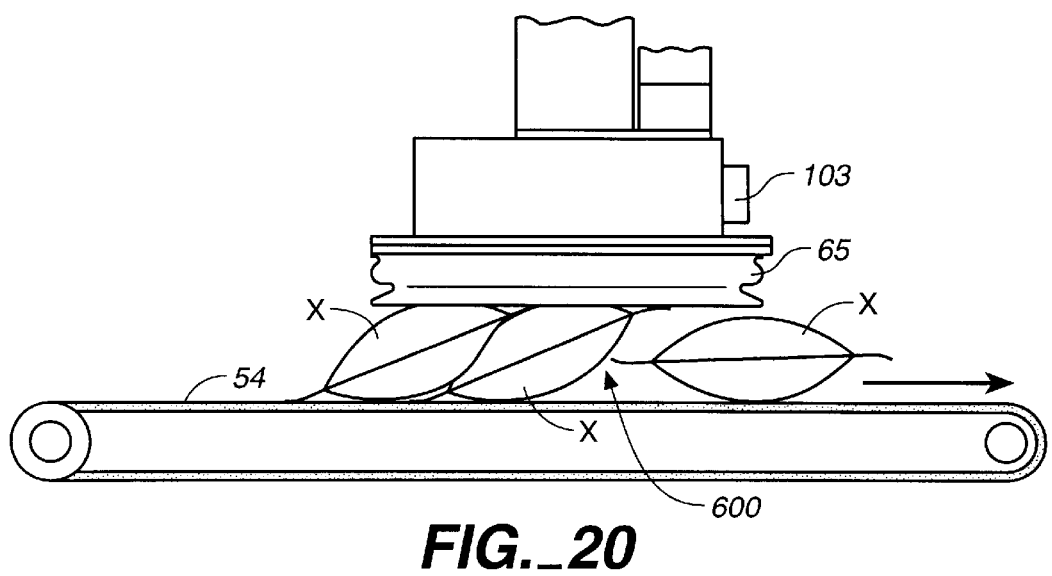
FIG._20

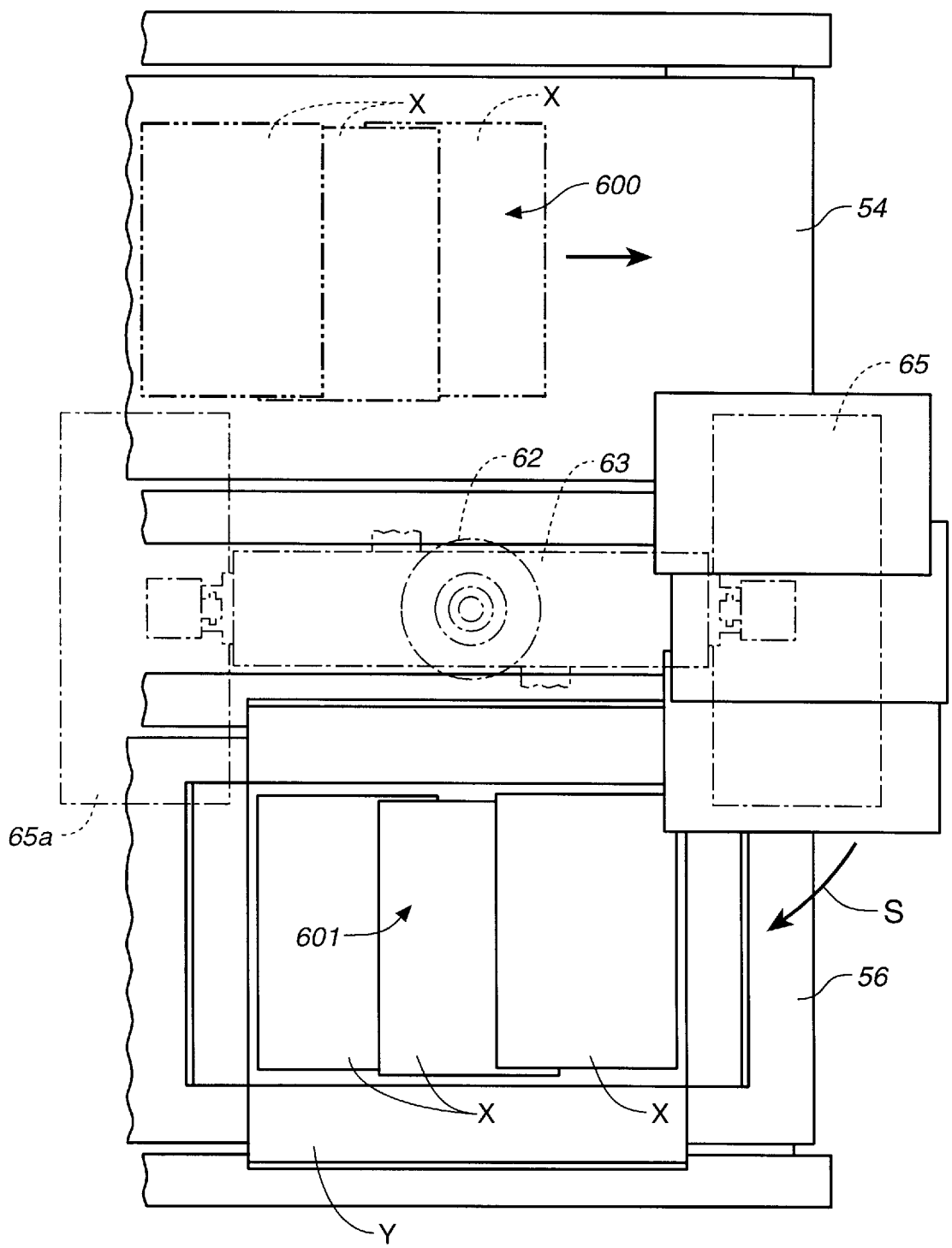
FIG._19

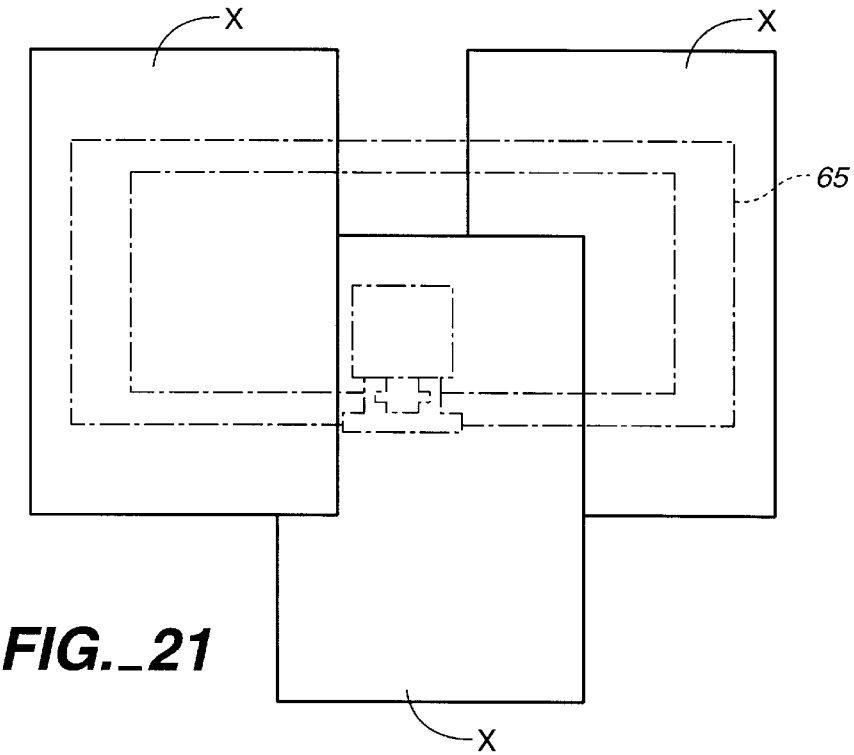
FIG._21
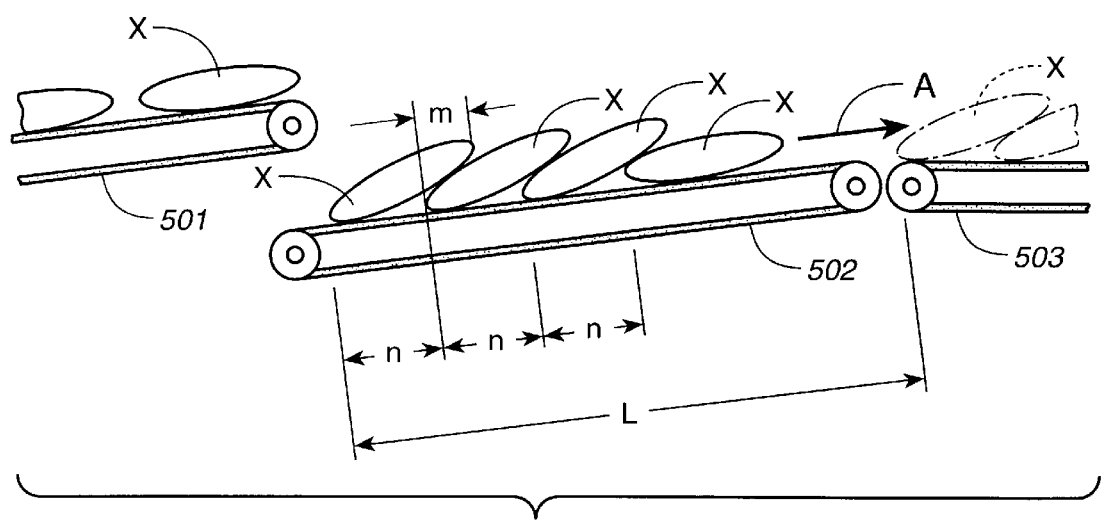
FIG._23
(PRIOR ART)

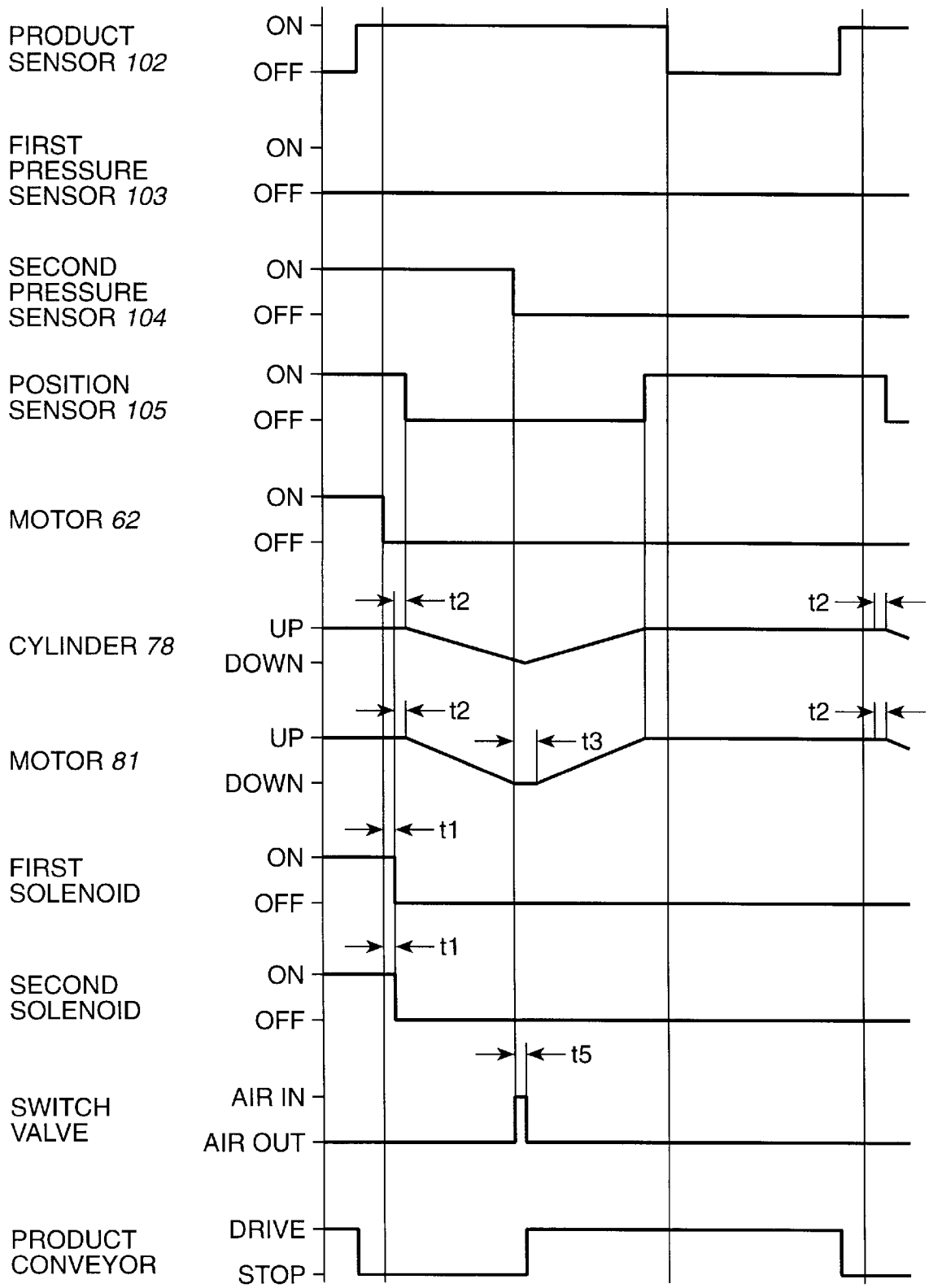
FIG._22

CASE PACKER

BACKGROUND OF THE INVENTION

This invention relates to a case packer, or an apparatus for sequentially depositing articles such as packaged products inside a case, or a container such as a cardboard box.

Products such as potato chips, already weighed and sealed in bags by means of a bag maker-packaging machine, are shipped to the market in containers such as cardboard boxes, each containing a specified number of these bags. Japanese Patent Publication Tokkai 6-263106, for example, disclosed a case packer which may be used for such a purpose, using conveyors to sequentially transport packaged products supplied from a bag maker-packaging machine and a packing mechanism for automatically arranging these packaged products inside a given container such as a cardboard box.

The aforementioned packing mechanism may comprise a holder member which is freely movable between a starting position above where the packaged products are brought in and a delivery position above where the container is placed to be filled, having a suction pad on its lower surface for sucking up and releasing products. If such a holder member is moved back and forth between its starting and delivery positions and lowered and raised at each of these positions, each packaged product brought in by the conveyor can be picked up from above by the suction pad and lowered into and deposited inside the container.

For a reason of economy, for example, it is often desirable to put as many packaged products as possible in a container by overlapping the side edges of mutually adjacent packages inside the container. FIG. 23 will be referenced next to explain how this is usually done.

As shown in FIG. 23, packaged products X are sequentially transported by a first belt 501, say, from a bag maker-packaging machine and dropped onto the upstream end of a second conveyor belt 502 to be further transported in the downstream direction indicated by arrow A. Each time a product X is dropped onto the upstream end of the second conveyor belt 502, the second conveyor belt 502 is advanced by a distance n which is shorter than the length of the (bag of the) product X by m (the overlapping length). After this process of intermittent motion is repeated for a specified number (four, in the example) of times, this specified number of products X are now aligned in a sequentially overlapping relationship in the direction of motion A. The second conveyor belt 502 is thereafter advanced in a continuous motion, sending off the aligned products x all at once onto a third conveyor belt 503 such that this group of products X can be captured together by the suction pad of the packing mechanism as they remain overlapped.

As soon as one such group of products X is transported over to the third conveyor belt 503, the mode of operation of the second conveyor belt 502 is switched from continuous to intermittent, beginning to receive another group of packaged products X from the first conveyor belt 501.

In this cycle of operations, the first conveyor belt 501 must be temporarily stopped as soon as the aforementioned continuous motion of the second conveyor belt 502 is started and made to wait until the group of products X then on the second conveyor belt 502 is completely transported over to the third conveyor belt 503 by advancing it by a distance indicated by letter L in FIG. 23. It is because, if the first conveyor belt 501 were not stopped and the next product X were allowed to drop onto the continuously moving second conveyor belt 502, this product X would advance farther than its length, and the following product X to be dropped from the first conveyor belt 501 would not be able to overlap properly with the preceding one. Thus, not only the first conveyer belt 501 but all processes which are being carried out on the upstream side of it must also be stopped temporarily and wait. This would delay the entire packing operation of the system as a whole.

With a packing mechanism as described above, furthermore, the holder member cannot be moved too fast back and forth between the starting position and the delivery position. Because only one group of products can be transported from the starting position to the delivery position as the holder member makes one cycle of its reciprocating motion, prior art packing mechanisms of this type are not sufficiently efficient. Moreover, the suction pad is not always successful in sucking up all of a group of products intended to be sucked up at any one time. If one or more of them fail to be picked up, or if all of them are picked up but some of them are not properly positioned when they are lifted up, the specified number of products may not be successfully deposited in the container or they may not be properly aligned inside the container as intended.

SUMMARY OF THE INVENTION

It is therefore an object of this invention to provide a more efficient case packer capable of reducing the waiting period during which the operations of its upstream components must be temporarily stopped while the products to be packed are overlapped as they are aligned.

It is another object of this invention to provide a case packer with a more efficient packing unit.

It is still another object of this invention to provide a case packer with a packing unit capable of more reliably delivering groups of a specified number of products into a container.

A case packer embodying this invention, with which the aforementioned waiting period can be reduced, may be characterized as comprising a product-supplying mechanism for transporting packaged products sequentially to a product-aligning mechanism including a plurality of conveyors arranged longitudinally towards a packing unit for packing a container with these transported products, and a control unit for starting to move the product-aligning mechanism in an intermittent motion every time a product is delivered from the first conveyor system so as to sequentially align them, thereafter moving the aligned products towards the packing unit in a continuous motion, and causing to move in the same intermittent motion each of these conveyors of the product-aligning mechanism sequentially one at a time from the upstream side every time the products aligned thereon are discharged therefrom.

The control unit may be alternatively programmed so as to cause the conveyor of the product-aligning mechanism on the upstream side to start moving in the intermittent mode of motion every time a product is delivered from the product-supplying mechanism so as to sequentially align the received products, thereafter moving the product-aligning mechanism in the continuous mode of motion to transport these aligned products towards the packing unit, and starting this upstream conveyor of the second conveyor system to move again in the intermittent mode every time the aligned products are discharged from it.

The control unit, according to a preferred embodiment, controls also the operation of the product-supplying mechanism, temporarily stopping it whenever the product-aligning mechanism is started to move in the continuous motion and restarting its motion before the upstream conveyer of the product-aligning mechanism receiving products from it switches its mode of motion from continuous to intermittent when the portion of the products still remaining thereon becomes equal to the distance traveled by it in each cycle of its intermittent motion.

With a case packer thus organized, packaged products which are discharged from the product-supplying mechanism are aligned on the product-aligning mechanism and then transported to the packing unit, but the product-supplying mechanism contains at least two conveyors arranged longitudinally one on the downstream side of the other such that the motion of the upstream conveyor can be switched from continuous to intermittent as soon as the products are transferred to the downstream conveyor, that is, without waiting until the products are all discharged from the product-aligning mechanism, and the product-supplying mechanism can restart its product-supplying operations as soon as the upstream conveyor of the product-aligning mechanism starts moving in the intermittent mode of motion. Thus, the wait periods of all components on the upstream side can be reduced according to this invention, and hence the overall efficiency of the packing process can be improved.

According to the preferred embodiment of the invention described above, furthermore, the product supplying operation by the product-supplying mechanism can be restarted even sooner, before the aligned products being transferred downstream are completely transferred from the upstream conveyor of the product-aligning mechanism. The intermittent mode of motion, and the product supplying operations of the product-supplying mechanism, can be restarted as soon as the length of the portion of the products still remaining on the upstream conveyor becomes equal to the distance traveled by the products in one cycle of the intermittent motion. This further reduces the aforementioned wait period and hence improves the efficiency of the packer even further.

A packing unit according to a preferred embodiment of this invention may be characterized as having an elongated member having two product-catching devices such as suction pads at its both ends and being supported rotatably such that a group of products which has been delivered can be picked up by one of them while another group which has already been picked up thereby can be released and deposited inside a container such as a cardboard box. This effectively reduces the number of cycles of the reciprocating rotary motion by such a member for transporting the same number of products and hence improves the packing efficiency.

According to a preferred embodiment, the packing unit is adapted to monitor the negative pressure provided to the suction pads for sucking up products to be transported. Means are further provided for stopping the packing operation if a drop in the negative pressure is detected and removing the products which caused the suction error such that a specified number of products can be reliably delivered into the container in a well aligned condition.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a schematic side view of a case packer embodying this invention for showing its overall structure;

FIG. 2 is an enlarged side view of the interior of an upstream end portion of the case packer of FIG. 1;

FIG. 3 is a partially sectional plan view of the sorting unit of the case packer of FIG. 1;

FIG. 4 is a sectional view taken along line 4—4 of FIG. 3;

FIG. 5 is a back view of the sorting unit of FIGS. 3 and 4;

FIG. 6 is a side view of a central portion of the aligning unit of the case packer of FIG. 1;

FIG. 7 is a view taken along line 7—7 of the packing unit of the case packer of FIG. 1;

FIG. 8 is a sectional plan view taken along line 8—8 of FIG. 7;

FIG. 9 is a side view of a locking mechanism in the packing unit with some parts removed;

FIG. 10 is a side view of the second elevator mechanism in the packing unit with some parts removed;

FIG. 11 is a sectional view taken along line 11—11 of FIG. 10;

FIG. 12 is a sectional view taken along line 12—12 of FIG. 7;

FIG. 13 is a sectional view taken along line 13—13 of FIG. 12

FIG. 14 is a block diagram of a portion of the control unit of the case packer of FIG. 1 for controlling the transportation of products from the moment when they are received by the weighing unit until they are delivered into the packing unit;

FIG. 15 is a block diagram of another portion of the control unit of the case packer of FIG. 1 for controlling the packing unit;

FIG. 16 is a time chart of the operations of the packing unit;

FIG. 17 is a simplified plan view of a portion of the packing unit for showing the operation of its arm;

FIG. 18 is a simplified side view of a suction pad lifting up products;

Page 19 is a simplified plan view of a portion of the packing unit for showing the motion of its arm;

FIG. 20 is a simplified side view of a suction pad when products are not being sucked up properly;

FIG. 21 is a simplified plan view of a suction pad when products are improperly aligned and are causing a suction error;

FIG. 22 is a time chart of the operations of the packing unit when a suction error occurs; and FIG. 23 is a side view of a prior art mechanism for aligning packaged products.

DETAILED DESCRIPTION OF THE INVENTION

As shown in FIG. 1, a case packer 1 according to this invention may be broadly characterized as comprising a weighing unit 2, an inspection unit 3, a sorting unit 4, an aligning unit 5 and a packing unit 6 for automatically filling a container such as a cardboard box Y efficiently and at a high density with packaged products X such as potato chips having a specified weight and sealed in a bag. The weighing unit 2 is not only for transporting packaged articles X dropped, say, from a bag maker-packaging machine (not shown) in a specified general direction of transportation indicated by arrow A but also for weighing the received products X. The inspection unit 3 is for transporting the weighed products X received from the weighing unit 2 along an upwardly sloped path while inspecting the seal condition of the bags and measuring their lengths. The sorting unit 4 is for discarding those of the products X received from the inspection unit 3 which were determined as defective and allowing to pass only those of the inspected products X which passed the inspection as being normal. The aligning unit 5 is for aligning a specified number of the products X allowed to pass by the sorting unit 4 such that their edge parts sequentially overlap in the direction of their transportation and transporting them in their sequentially overlapped and aligned condition into the packing unit 6. The packing unit 6 is for picking up the specified number of mutually overlapping and aligned products X received from the aligning unit 5 and quickly depositing them at a high packing density into a cardboard box Y which has been independently brought into the packing unit 6.

As shown more in detail in FIG. 2, the weighing unit 2 includes a first conveyor 21 and a second conveyor 22. The first conveyor 21 is for receiving the products X sequentially dropped thereonto through a chute 21h and transporting them in the direction of transportation A. The second conveyor 22 is disposed on the downstream side of the first conveyor 21 and serves to transport the products X in a somewhat upward direction. Each conveyor 21 or 22 is provided with a pair of rollers 21b and 21c or 22b and 22c rotatably supported by a supporting frame 21a or 22a, an endless belt 21d or 22d which may be a timing belt stretched therebetween, and a drive motor 21f or 22f attached to the support frame 21a or 22a and serving to drive the roller 21c or 22c through a transmission belt 21e or 22e.

The support frame 21a of the first conveyor 21 is attached to a bracket 21g set on a base 23 affixed to the weighing unit 2 through a support shaft 21c' of the roller 21c such that the first conveyor 21 can be swung around the support shaft 21c' and that the height of its upstream end can be properly adjusted according to the dimensions of the bag maker-packaging machine from which the products X are supplied.

The support frame 22a of the second conveyor 22 is attached to the same base 23 as explained above through a leg member 22g. Although not shown in FIG. 2, a weighing device (indicated by numeral 24 in FIG. 14) which may comprise a load cell is provided inside the support frame 22a such that the weight of the product X being transported on its belt 22d can be measured.

The inspection unit 3 includes a third conveyor 31 comprising a pair of rollers 31b and 31c rotatably supported by a support frame 31a, an endless belt 31d which may be a timing belt stretched between these rollers 31b and 31c, and a drive motor 31f for driving the roller 31c through a transmission belt 31e. The support frame 31a is affixed to brackets 32 and 33 set inside the inspection unit 3.

The inspection unit 3 also includes an evening device 34 and a seal checker 35 disposed in this order along the transportation path of the products. The evening device 34 is for making the height of the products X even while they are being transported on the third conveyor 31, and the seal checker 35 is for detecting defectively sealed bags. The evening device 34 and the seal checker 35 are structured alike, each comprising L-shaped linking members 34a or 35a rotatably supported by the support frame 31a around support shafts 34a' or 35a', a compression plate 34b or 35b and a cylinder device 34d or 35d. The compression plates 34b and 35b are each rotatably supported at a top end part of the linking members 34a or 35a and disposed above the belt 31d. The cylinder devices 34d and 35d are each rotatably supported by the frame 31a around a support shaft 34d' or 35d', having a piston rod 34c or 35c rotatably connected to the lower end part of the linking member 34a or 35a. As the compression plates 34b and 35b are moved up and down, the linking members 34a and 35a swing around the support shafts 34a' and 35a' such that the piston rods 34c and 35c can move outward and inward.

The compression plates 34b and 35b are normally biased downward with a specified pressure by the cylinder devices 34d and 35d. The compression plate 34b of the evening device 34 makes use of this downward force to make even the height of the products x being transported on the third conveyor 31. The cylinder device 35d of the seal checker 35 is provided with a linear encoder 35e for detecting the displacement of its piston rod 35c and thereby detecting products with defective sealing as they are transported on the third conveyor 31.

Protective plates 25 and 36 are provided next to the second conveyor 22 of the weighing unit 2 and the third conveyor 31 of the inspection unit 3 in order to prevent the products X from falling down. Near the entrance to the seal checker 35 on the protective plate 36 for the inspection unit 3 is a product length sensor 37 for detecting the passing of each product X such that its length can be determined from the time it takes to pass in front of the sensor 37.

As shown in FIGS. 3, 4 and 5, the sorting unit 4 has a rectangular frame 41 with an open upper surface, set, as shown in FIG. 1, on a base structure 1a of the case packer 1. Many mutually parallel rollers 42 are rotatably supported thereby at elevated positions, protruding slightly upward through upper openings 41a of the frame 41 to define a surface for transporting the products X thereon.

Below these rollers 42 is a shaft 43 rotatably supported by the frame 41 perpendicularly to the rollers 42. A drive motor 44 is set inside the frame 41 through a bracket 44a, and an endless timing belt 44d is stretched between a pulley 43a on this shaft 43 and the drive shaft 44b of this motor 44. Power-communicating ropes 42b are wound between circumferentially formed grooves 42a on the rollers 42 and the shaft 43 such that the rotary motion of the drive shaft 44b of the motor 44 is communicated to each of the rollers 42 through these ropes 42b, causing the product X delivered from the inspection unit 3 onto these rollers 42 to be transported further in the downstream direction indicated again by arrow A. The inspection unit 3 and the sorting unit 4 are so positioned with respect to each other that the product X delivered from the inspection unit 3 will be deposited on the upper left-hand side of the sorting unit 4 with reference to FIG. 3.

Directly below the rollers 42 is a set of three shafts 45 rotatably supported by the frame 41 perpendicularly to the rollers 42, that is, in the direction of motion A of the products X and on the left-hand side of the rollers 42 as seen in the direction of arrow A. A drive motor 46 therefor is attached to the inner surface of the back wall 41b of this sorting unit 4 on its downstream side. The back ends of these three shafts 45 and the tip of the drive shaft 46a of this drive motor 46 all penetrate and protrude from the back surface of this back wall 41b of the sorting unit 4, and an endless timing belt 48 is stretched over pulleys 45a and 46b attached to these backwardly protruding parts of the shafts 45 and 46a as well as a tension pulley 47 such that the rotary motion of this drive motor 46 can be communicated to the three shafts 45.

A plurality (five in this example) of sorting members 49 are provided where delivered products from the inspection unit 3 are deposited on the rollers 42, that is, on the upper left-hand part as seen in FIG. 3. Each of these sorting members 49 is quasi-circular, having the shape of a circle with a smaller portion thereof removed along a straight line 49a (and hence is larger than a semi-circle), and is mounted to one of the three shafts 45 through the center. They are so designed that, when the shafts 45 are rotated and their straight edges 49a are horizontal above the shafts 45 (as shown by solid lines in FIG. 4), they are in a retracted position and do not protrude above the surface of transportation by the rollers 42. If the shafts 45 are rotated from this retracted position in the direction shown by arrow B shown in FIGS. 3 and 4, the sorting members 49 protrude above the rollers 42 as shown by broken lines in FIG. 4.

With the sorting unit 4 thus structured, the product x delivered from the inspection unit 4 is transported directly in the direction of arrow A if the sorting members 49 are in their retracted positions. If the shafts 45 are rotated from the retracted position as a product X is transported on the rollers 42, the product X is lifted by the circular edge parts 49b from the upper surfaces of the rollers 42 and pushed transversely by the rotary motion of the sorting members 49, that is, away from the path of its normal transportation.

The aligning unit 5, as shown in FIGS. 1 and 6, includes a total of three (first, second and third) support frames 51a, 52a and 53a set along the direction of motion A of the products X on the base structure 1a of the case packer 1. The first support frame 51a supports thereon a first conveyor 51 which is slightly upwardly sloped, and the second support frame 52a supports thereon a second conveyor 52 and a third conveyor 53 which are also slightly upwardly sloped and somewhat shorter than the first conveyor 51. The third support frame 53a includes a fourth conveyor 54 which extends horizontally into the packing unit 6. As will be explained below, the fourth conveyor 54 of the aligning unit 5 serves also as a product supplying conveyor in the operation of the packing unit 6 and hence will also be referred to as "the product supplying conveyor 54" in connection with the packing operations inside the packing unit 6.

These four conveyors 51–54 of the aligning unit 5 are all structured similarly as described above for the conveyors 21, 22 and 31 of the weighing unit 2 and the inspection unit 3. Their structure will be described for the completeness of disclosure, but only very briefly. As shown in FIG. 6, pairs of rollers 51b, 51b, 52b, 52c, 53b, 53c, 54b and 54c are rotatably supported each by corresponding one of the support frames 51a, 52a and 53a, and belts 51d, 52d, 53d and 54d which may be endless timing belts are stretched thereover. Drive motors 51f, 52f, 53f and 54f each attached to corresponding one of the support frames 51a, 52a and 53a communicate their rotary power through power communicating means shown at 51e, 52e, 53e and 54e in FIGS. 1 and 6.

The end on the upstream side of the second conveyor 52 is disposed below the end on the downstream side of the first conveyor 51 such that the products X delivered by the first conveyor 51 will be dropped onto the second conveyor 52 to be transported in the general direction of motion shown by arrow A.

A discharge timing sensor 55 is disposed near the downstream end part of the first conveyor 51, as shown in FIG. 6. The discharge timing sensor 55 is similar to the product length sensor 37 explained above with reference to the inspection unit 3. The discharge timing sensor 55 serves to detect the passing of the rear end of each product X for determining the timing of its dropping from the first conveyor 51. It is preferred that each of the drive motors 51f, 52f, 53f and 54f be a servo motor of which the rotation can be controlled by the number of output pulses.

The packing unit 6 according to this invention will be described next with reference to FIG. 7, as comprising a housing 61, a swinging elongated member referenced herein as "the arm 63", a servo motor 62 for its rotary motion, support members 64 and 64a, suction pads 65 and 65a, a first elevator mechanism 66 and a second elevator mechanism 67. More in detail, the housing 61 includes a top wall 61a and a pair of side walls 61b and 61c to enclose therein the product supplying conveyor 54 (referred to above as "the fourth conveyor" of the aligning unit 5) and another conveyor 56 (herein referred to as "the box conveyor") disposed parallel thereto for transporting containers such as cardboard boxes Y. The servo motor 62 is affixed at an elevated position inside the housing 61 and its drive shaft 62a undergoes a reciprocating angular motion of 180° intermittently. The arm 63 is affixed to the drive shaft 62a of the servo motor 62 so as to rotate reciprocatingly in a horizontal plane between a first position above the product supplying conveyor 54 and a second position above the box conveyor 56 for transporting containers. The support members 64 and 64a are vertically elongated and supported by the arm 63 at its both ends so as to be movable vertically upward and downward. The suction pads 65 and 65a are attached to bottom parts of the support members 64 and 64a, respectively, for sucking up the products X at a specified pick-up position 600 on the product supplying conveyor 54 and releasing them at a specified drop-off position 601 above the box conveyor 56. The first elevator mechanism 66 is for engaging selectively with the support members 64 and 64a above the pick-up position 600 and moving them vertically upward and downward. The second elevator mechanism 67 is for engaging selectively with the support members 64 and 64a above the specified drop-off position 601 and moving them vertically upward and downward.

Explained still more in detail, the arm 63 is extended on opposite directions from its axis of rotation and, as shown in FIG. 8, guide members 68 and 68a each having a vertical guide throughhole 68' or 68a' are attached to its end parts. The support members 64 and 64a are each square-shaped cross-sectionally. A vertically elongated rail 69 or 69a is attached to one of the side surfaces so as to slidably engage with a corresponding one of the guide throughholes 68' and 68a' such that each of the support members 64 and 64a can slide upward or downward with respect to the arm 63. Locking mechanisms 71 and 71a are provided between the arm 63 and the support members 64 and 64a, as shown in FIG. 9, for locking the support members 64 and 64a to the arm 63 at their raised positions.

Each of these locking mechanisms 71 and 71a comprises a solenoid 74 or 74a attached to the lower surface of an end part of the arm 63 through a bracket 72 or 72a for moving a lock pin 73 or 73a forward or backward and an engagement plate 76 or 76a having a hole 76' or 76a' attached to the lower edge part of the support member 64 or 64a through an attachment plate 75 or 75a. When the arm 63 is rotated for moving the support members 64 and 64a, the solenoids 74 and 74a cause the lock pins 73 and 73a to advance into the holes 76' and 76a' of the engagement plates 76 and 76a such that the support members 64 and 64a can be locked to the arm 63.

The first elevator mechanism 66 comprises a cylinder 78 attached through a supporting arm 77 to the side wall 61c of the housing 61 on the side of the product supplying conveyor 54 such that the support member 64 or 64a on the side of the product supplying conveyor 54 can be moved upward or downward by pushing its piston rod 78a in or out. The second elevator mechanism 67 comprises, as shown in FIGS. 10 and 11, a servo motor 81, a ball screw 83, a guide rail 84, a slider 85 and a supporting arm member 86. The servo motor 81 is attached through a support frame 79 to the other of the side walls 61b of the housing 61. The ball screw 83 is adapted to be rotated by the servo motor 81 through its motion-communicating belt mechanism 82. The guide rail 84 is affixed to the same side wall 61b as the servo motor 81 and cross-sectionally U-shaped, serving to hold the ball screw 83 vertically. The slider 85 is adapted to engage both with the ball screw 83 and the guide surfaces 84a of the guide rail 84 so as to move vertically upward and downward along the guide rail 84 as the ball screw 83 is rotated. The supporting arm member 86 is affixed to an outer side wall of the slider 85 and extends inward horizontally.

The first and second elevator mechanisms 66 and 67 are designed such that whenever either of the two supporting members 64 and 64a is above the pick-up position 600 and engages with the first elevator mechanism 66, the other will be automatically above the drop-off position 601 above the box conveyor 56 and engage with the second elevator mechanism 67. Engaging mechanisms 87 and 87a for engaging the supporting members 64 and 64a with the first and second elevator mechanisms 66 and 67 are illustrated in FIGS. 12 and 13, each comprising a hooking member 88 or 88a protruding outward from each supporting member 64 or 64a and engaging members 89 and 89a which are provided respectively at the tip of the piston rod 78a of the cylinder 78 and the tip of the supporting arm member 86 and are capable of engaging with the hooking members 88 and 88a. Since these two engaging mechanisms are structured similarly, they will be described together next for the sake of convenience.

With reference still to FIG. 12 and 13, each of the hooking members 88 and 88a has sloped parts 88' and 88a' formed at both side parts on the lower surface, and each of the engaging members 89 and 89a comprises a support roller 91 or 91a for supporting its lower surface and an engaging-supporting member 93 or 93a which supports this support roller 91 or 91a rotatably and has an engaging part 92 or 92a for engaging with the upper surface of the hooking member 88 or 88a. When the hooking member 88 or 88a engages with the engaging member 89 or 89a, the hooking member 88 or 88a is first lifted over the sloped part 88' or 88a' in contact with the support roller 91 or 91a as shown by dotted line in FIG. 13 and then engagingly supported on the support roller 91 or 91a. This lifting of the hooking member 88 or 88a serves to prevent interference when the lock pin 73 or 73a of the locking mechanisms 71 and 71a is inserted into the hole 76' or 76a' of the engagement plate 76 or 76a such that the load on the support members 64 and 64a will not work on the lock pins 73 and 73a and that the lock pins 73 can be pushed into and pulled out of the holes 76' and 76a' smoothly.

The suction pads 65 and 65a are detachably attached to the bottom end of the support members 64 and 64a such that they can be replaced easily. As shown in FIGS. 7 and 9, a sectionally U-shaped attaching plate 94 or 94a is attached to the top surface of each suction pad 65 or 65a so as to be engageable with the outer side surface of the support member 64 or 64a. Attachment bolts 95 or 95a provided on side surfaces of the attaching plate 94 or 94a are used for this detachable attachment. Thus, suction pads of different kinds can be used, depending on the size and shape of the products X to be lifted thereby.

The two suction pads 65 and 65a are connected through flexible pipes 96 and 97 to a blower 98 disposed below the product supplying conveyor 54. Each of these pipes 96 and 97 has an upper part 96b or 97b and a lower part 96a or 97a, connected by a switch valve 99 in between which may be an electromagnetic valve. The lower part of one of the pipes 96a and 97a is connected to a suction inlet of the blower 98, and that of the other is connected to its discharge outlet. The switch valve 99 serves to connect the upper parts 96b and 97b alternately with the lower parts 96a and 97a such that one of the suction pads 65 and 65a will be sucking up a group of products X from the product supplying conveyor 54 simultaneously as the other is dropping another group of products X into the cardboard box Y positioned at the drop-off position 601 above the box conveyor 56.

The portion of a control unit for the case packer 1 for controlling the transportation of products X from its weighing unit 2 to the packing unit 6 is schematically shown at 7 in FIG. 14. Thus, the control unit 7 receives weight signals from the weighing device 24 of the weighing unit 2, inspection signals from the seal checker 35 and length signals from the product length sensor 37, and timing signals from the discharge timing sensor 55 of the aligning unit 5 and, on the basis of these received signals, outputs drive signals to the drive motors 21f and 22f of the weighing unit 2, the third drive motor 31f of the inspection unit 3, the motor 44 of the sorting unit 4, the servo motor 46 and each of the four drive motors 51f, 52f, 53f and 54f of the aligning unit 5 such that defective products are discarded off the path of transportation and a specified number of only normal products are aligned with their front and back edges overlapped by a specified distance and delivered to the packing unit 6.

Next, the control operations by the control unit 7 will be explained more in detail.

After each packaged product X is delivered to the upstream end of the weighing unit 2, it is transported by its first conveyor 21 to the second conveyor 22 on the downstream side. The second conveyor 22 stops momentarily to have the product X weighed by the weighing device 24 provided inside the second conveyor 22 and then starts its motion again to deliver the weighed product X to the inspection unit 3. Although not shown in the figures, there is a third sensor, similar to the product length sensors 37 of the inspection unit 3 and the discharge timing sensor 55 of the aligning unit 5, for detecting the presence of a product at the position of the weighing device 24, serving to cause the control unit 7 to stop the drive motor 22f for the second conveyor 22 when this sensor detects the arrival of a new product X at the position of the weighing device 24 and to restart its motion when the weight signal from the weighing device 24 stabilizes.

The product X delivered to the inspection unit 3 is transported by its third conveyor 31 to the sorting unit 4. In the meantime, its shape is made even by the compression plate 34b of the evening device 34 provided along the path of transportation, and the condition of its sealing is checked by the seal checker 35. The length of the product X is calculated by the control unit 7 by measuring the time it takes to pass the product length sensor 37. It is to be noted that the product length sensor 37 is near the entrance to the seal checker 35 but it is designed such that if a product X with a normal length enters the seal checker, its front end will be still on the third conveyor 31 of the inspection unit 3 and will have not reached the sorting members 49 of the sorting unit 4 as of the time when its rear end is detected by the product length sensor 37. Thus, the product X is delivered to the sorting unit 4 only after it has been determined whether its length is normal or not.

The control unit 7 also serves to observe the position of the piston rod 35c by the encoder 35e from the moment when a product X enters the seal checker 35 and its front end is detected by the product length sensor 37 until a specified approximate length of time required for the product X to entirely come inside the seal checker 35, determining whether the displacement value is over a specified value or not. If the displacement value is less than the specified value, the control unit 7 concludes that the bag has no leak. If otherwise, it concludes that the product X is defective. In this control, it is preferable to set this length of time equal to the time required for the front end of the product X to reach the sorting members 49 of the sorting unit 4 so as to prevent a delay in the response in the sorting operation against a product which may be normal in length but is determined defective by this test.

The product x delivered from the inspection unit 3 to the sorting unit 4 is further transported in the downstream direction by the rollers 42. Those products X determined to be normal by the time they were delivered to the sorting unit 4 are allowed to go straight over the rollers 42 but those determined to be defective are discarded away from the path of transportation. For a normal product, the control unit 7 not only activates the drive motor 44 to cause the rollers 42 to rotate but also controls the servo motor 46 such that the sorting members 49 are in their retracted positions, without protruding above the top surfaces of the rollers 42, thus allowing the product to travel straight to the aligning unit 5. For a defective product, the control unit 7 controls the servo motor 46 such that the sorting members 49 will turn to the left from their retracted positions, thereby lifting the incoming defective product and moving it transversely to the left to discharge it from its normal path of transportation to the aligning unit 5 on the downstream side. The rotary motion of the sorting members 49 is adjusted so as to start at the time of discharge of the product X onto the sorting unit 4, calculated from the time when the product X passed the product length sensor 37.

The angle by which the sorting members 49 are rotated to discharge a defective product is varied by the control unit 7 according to the measured length of the defective product to be discharged. Thus, if the product to be discharged has a short bag length, the sorting members 49 are rotated by a smaller angle. If the product to be discharges is longer, the angle of rotation of the sorting members 49 is increased accordingly, or they can even be made to rotate repeatedly. This control can respond to situations when an error in the bag maker-packaging machine, for example, results in a product packaged in an abnormally long bag. The angle of rotation of the sorting members 49 is calculated on the basis of the length of the product measured by the product length sensor 37.

The normal products X delivered from the sorting unit 4 to the aligning unit 5 are made into groups of a specified number, aligned such that they overlap in the direction of transportation by a specified length and delivered further downstream to the packing unit 6.

Regarding the aligning unit 5, the control unit 7 activates its first conveyor 51 to transport the incoming products X sequentially, dropping them onto the upstream end of the second conveyor 52. The number of the products X thus dropped onto the second conveyor 52 is monitored by the timing sensor 55, and when a specified number of products X has been counted, the servo motor 54f for the first conveyor 51 is stopped after the calculated time required for the last product to pass the timing sensor 55 to be dropped onto the second conveyor 52. As the servo motor 54f for the first conveyor 51 is thus stopped, all the drive motors on the upstream side are also stopped such that the products X will not be overlapped on their path of transportation.

The servo motors 52f and 53f for the second and third conveyors 52 and 53 are activated intermittently, as explained above, moving the second and third conveyors 52 and 53 intermittently by a specified distance every time a product X is dropped onto the second conveyor 52 from the first conveyor 51. This specified distance is, as shown in FIG. 6, shorter by m than the length of the bags for the products X. This is repeated until the specified number of products X dropped from the first conveyor 51 are aligned in a mutually overlapped group as shown in FIG. 6.

When the last of the group of products X has been thus overlappingly aligned, the control unit 7 causes the second and third conveyors 52 and 53 to move in a continuous motion to deliver this group of mutually overlapped products X all at once onto the fourth conveyor 54. The servo motor 54f for the fourth conveyor 54 is controlled such that the products X thereon are carried to the specified pick-up position 600 inside the packing unit 6.

During this continuous motion of the group of products X onto the fourth conveyor 54, the control unit 7 switches the mode of operation of the second conveyor 52 from continuous to intermittent as soon as the rear end of this group of products X clears the second conveyor 52 and passes onto the third conveyor 53. By this manner of control, the aligning unit 5 can start receiving the next group of products X from the sorting unit 4, without waiting until the entire group of the products X is discharged onto the fourth conveyor 54. It now goes without saying that this improves the efficiency of operation of the case packer 1 as a whole.

According to a still more improved mode of control, the intermittent mode of movement of the second conveyor 52, as well as the delivery of products X from the first conveyor 51, may be restarted without waiting until the rear end of the preceding group of products X passes onto the third conveyor 53. It may be started when there is only the last one of the preceding group of products left on the second conveyor 52 such that this last product of the preceding group will be discharged onto the third conveyor 53 in the next cycle of the intermittent motion of the second conveyor 52, together with the first product X of the next group to be formed. This can improve the overall efficiency of the case packer 1 even more.

FIG. 15 shows another part of the control system 100 for the control of the packing unit 6, comprising a controller 101 connected to receive signals from a product sensor 102 positioned near the product supplying conveyor 54 (which was referred to above as the fourth conveyor of the aligning unit 5) as shown in FIG. 7 to check if a group of products has arrived at the pick-up position 600, first and second pressure sensors 103 and 104 which are provided individually to the suction pads 65 and 65a as shown in FIG. 7 to detect changes in their negative pressure when the products x on the product supplying conveyor 54 are sucked up thereby, and a position sensor 105 which is attached to the cylinder 78 of the first elevator mechanism 66 as shown in FIG. 7 to check whether the support member 64 has reached its raised position or not. In response to such input signals, the controller 101 serves to output signals to the servo motor 62 for rotary motion of the arm 63, the cylinder 78 of the first elevator mechanism 66, the servo motor 81 of the second elevator mechanism 67, the solenoids 74 and 74a for the locking mechanisms 71 and 71a, the switch valve 99 and the conveyor 54.

If the negative pressure required for sucking up the products X on the product supplying conveyor 54 is not detected by a corresponding one of the pressure sensors 103 or 104, the controller 101 responds to an input signal to this effect and stops the suction operation before the arm 63 is rotated. In this case, the sucked-up products X are returned to the pick-up position 600 and the product supplying conveyor 54 is activated to discharge the returned products, serving now as a product discharging conveyor.

As shown in FIGS. 8 and 9, two (first and second) target members 106 and 107 are erected at one end part of the arm 63, and two stationary holder plates 108 and 109 are affixed below the motor 62 for the arm 63. A so-called origin sensor 110 is attached to the lower surface of the holder plate 108, serving to determine a reference point ("the origin") by detecting the first target member 106 when the motor 62 is started. A pair of overrun sensors 111 and 112 is attached to the lower surfaces of the holder plates 108 and 109 approximately opposite to each other with respect to the axis of rotation of the arm 63. If either of the overrun sensors 111 and 112 detects the second target member 107, it means that the arm 63 has overrun its limit. A warning signal is then outputted, and the controller 101 responds to it by forcibly stopping the motor 62 to prevent any damage to the components due to the overrun condition.

Operations of the packing unit 6 under the control of the control system 100 will be explained next with reference to the time chart of FIG. 16 from a time shortly before the arm 63 completes one of its rotary motions until the sucking and packing operations are simultaneously carried out and the arm 63 is rotated by 180° again.

Shortly before the rotary motion of the arm 63 is completed, a group of a specified number of products X is delivered to the fourth conveyor of the aligning unit 5 (or the product supplying conveyor 54), causing the sensor 102 to output a detection signal. When the rotation of the arm 63 is completed shortly thereafter, the hooking members 88 and 88a are in the lifted positions shown by dotted lines in FIG. 13 by the engaging members 89 and 89a contacting the sloped parts 88' and 88a'. With the arm 63 thus lifted, the load from the support members 64 and 64' on the lock pins 73 and 73a of the locking mechanisms 71 and 71a ceases to apply.

After (by time $t_1$) the rotation of the arm 63 is completed such that the suction pad 65 is now above the group of products just brought to the pick-up position 600 and the other suction pad 65a is above the cardboard box Y delivered to the drop-off position 601 by the box conveyor 56, the controller 101 activates the solenoids 74 and 74a of the locking mechanisms 71 and 71a to retract the lock pins 73 and 73a from the holes 76' and 76a' of the engagement plates 76 and 76a. After (by time $t_2$) the arm 63 is thus unlocked from the support members 64 and 64a, the controller 101 activates the cylinder 78 of the first elevator mechanism 66 and the motor 81 of the second elevator mechanism 67 to move the support members 64 and 64a to their lowered positions indicated by dotted lines in FIG. 7.

Thereafter, when the suction pad 65a on the support member 64a has been lowered to the position of the cardboard box Y, the controller 101 activates the switch valve 99 to change the directions of flow of air into and out of the suction pads 65 and 65a such that the suction pad 65a drops the products X which have been sucked thereto by the negative pressure created by the blower 98. At the very beginning of the packing operation before the arm 63 is first rotated, there is no product sucked to a sucking pad, there is no packing operation to be carried out.

When the other suction pad 65 has been lowered to its lowered position directly above the products X at the pick-up position 600, the direction of air flow from the blower 98 is such that these products X are sucked up by the negative pressure communicated through the suction pad 65 thereabove. If the specified number (three in the example shown in FIG. 18 of the products X are properly sucked up in their mutually overlapped condition, as shown in FIG. 18, the negative pressure at this suction pad 65 keeps rising. When the pressure sensor 103 is switched on by detecting that it has reached a specified pressure value, the controller 101 activates the cylinder 78 of the first elevator mechanism 66 to move the support member 64 upwards to its lifted position. When the arrival of the support member 64 at its lifted position is detected by the position sensor 105, the controller 101 activates the first solenoid 74 of the first locking mechanism 71, thereby inserting its lock pin 73 into the hole 76' of the engagement plate 76 and locking the support member 64 with the arm 63. As the products X are thus lifted by this upward motion of the support member 64, the product sensor 102 is switched off.

After (by time $t_3$) the suction pad 65a is lowered to the drop-off position 601 (as shown by dotted lines in FIG. 7), the motor 81 of the second elevator mechanism 67 reverses its direction of motion and lifts the support member 64a to its lifted position. After (by time $t_4$) the support member 64a reaches its lifted position, the controller 101 activates the second solenoid 74a for the second locking mechanism 71a, causing its lock pin 73a to be inserted into the hole 76a' of the engagement plate 76a to thereby lock the support member 64a to the arm 63.

After the support members 64 and 64a are thus both locked to the arm 63 by the locking mechanisms 71 and 71a, the controller 101 activates the motor 62 to rotate the arm 63 by 180° from the condition shown in FIG. 17 to the condition shown in FIG. 19 as shown by arrow S. Thus, the suction pad 65 carrying the products X is now above the drop-off position 601 and the other suction pad 65a which has just released its load of products is above the pick-up position 600. Shortly before the arm 63 completes this rotary motion, another group of the specified number of products X is delivered onto the product supplying conveyor 54 and the detection sensor 102 is switched on. By the time the arm 63 completes its rotary motion, the hooking members 88 and 88a of the engaging mechanisms 87 and 87a are lifted by the support rollers 91 and 91a contacting the sloped parts 88' and 88a'. After (by time $t_1$) the completion of the rotary motion of the arm 63, the controller 101 again activates the solenoids 74 and 74a of the locking mechanisms 71 and 71a to release the lock between the support members 64 and 64a and the arm 63.

After (by time $t_2$) the locking mechanisms 71 and 71a are released as described above, the controller 101 activates both the cylinder 78 of the first elevator mechanism 66 and the motor 81 of the second elevator mechanism 67 to lower both support members 64 and 64a, as described above, for carrying out both sucking up and packing operations at the same time. Thereafter, the motor 62 is activated to rotate the arm 63 in the reverse direction as shown by arrow S' in FIG. 17. The series of operations described above is repeated for any number of times.

During the packing operation described above, there may be situations where the negative suction pressure of either of the suction pads 65 and 65a does not rise high enough due, for example, to a suction error wherein one of the group of products intended to be picked up cannot be sucked up as shown in FIG. 20, or wherein products are sucked up while they are in a misaligned condition as shown in FIG. 21. In such a situation, the pressure inside the suction pad does not reach a specified level, and a warning signal to this effect is received by the controller 101. The operation of the controller 101 in such a situation will be explained next with reference to the time chart of FIG. 22.

The time chart of FIG. 22 is different from that of FIG. 16 under normal conditions in that the pressure sensor 103 of the suction pad 65, for example, fails to switch on, indicating that there was an error in sucking up products. In response, the controller 101, after waiting for a time period of $t_5$ as shown in FIG. 22, switches the valve 99 to abort the sucking operation by the suction pad 65, allowing the products to drop onto the product supplying conveyor 54. Next, the cylinder 78 of the first elevator mechanism 66 is activated to move the support member 64 to its lifted position temporarily, while the product supplying conveyor 54 is activated for discharging the products which could not be sucked up successfully. Those discharged products X may be collected and returned to the weighing unit 2 such that they will again travel through the inspection unit 3, the sorting unit 4 and the aligning unit 5 and return to the packing unit 6.

After the group of products which could not be sucked up is thus discharged, a new group of products is delivered from the aligning unit 5. The controller 101 activates the cylinder 78 and the motor 81 of the elevator mechanisms 66 and 67 to repeat the attempt at sucking up the new group of products while at the same time dropping the already sucked-up products into the waiting cardboard box Y from the other suction pad 65a.

Thus controlled, the arm 63 is rotated only when all of the intended products to be sucked up have been properly sucked up, with the negative suction pressure for the corresponding suction pad 65 or 65a reaching the specified standard level. This makes it unnecessary to check the weight of the cardboard box Y to determine whether the specified number of products in a new group have all been received therein.

With the packing unit 6 thus designed, the load on the arm 63 can be reduced significantly and the angular momentum acquired thereby can be controlled easily with the motor 62. In other words, the speed of the rotary motion of the arm 63 can be increased, and the efficiency of the case packer 1 as a whole can also be improved.

Although the invention was described above with reference to only one embodiment, this embodiment is not intended to limit the scope of the invention. Although the first elevator mechanism 66 is described as using a cylinder 78 for provide a vertical motion, this may be replaced by an electric motor. According to a preferred embodiment, furthermore, the downward motion of the support members 64 and 64a may be controlled for each stroke, depending upon the height of the drop-off position 601 which may change each time, especially when the products X are arranged in layers inside the container. In summary, all modifications and variations of the description give above, which may be apparent to a person skilled in the art, are intended to be within the scope of this invention.

What is claimed is:

1. A case packer comprising:
   a product-supplying mechanism for transporting packaged products sequentially in a downstream direction from an upstream side;
   a product-aligning mechanism for receiving products from said product-supplying mechanism and transporting said received products further in said downstream direction, said product-aligning mechanism comprising a plurality of conveyors, inclusive of a product-aligning conveyor, arranged sequentially from said upstream side in said downstream direction;
   a packing unit for receiving products from said product-aligning mechanism and packing a container with said transported products from said product-aligning mechanism; and
   a control unit for moving said product-aligning conveyor in an intermittent motion every time a product is delivered thereonto so as to sequentially align a specified number of the delivered products thereon to form a group, thereafter moving said plurality of conveyors in a continuous motion to deliver said group of aligned products towards said packing unit, and causing each of said conveyors of said product-aligning mechanism sequentially one at a time from said upstream side to switch from said continuous motion to said intermittent motion every time said aligned products are discharged therefrom in said downstream direction.

2. The case packer of claim 1 wherein said packing unit comprises:
   an elongated member rotatable between a first position above a pick-up position where products to be packed are introduced into said packing unit and a second position above a drop-off position where said products are dropped off into a container;
   catching devices at both ends of said elongated member for catching and releasing said products; and
   means for rotating said elongated member horizontally, one of said catching devices being above said pick-up position when the other of said catching devices is above said drop-off position, and said the other catching device being above said pick-up position when said one catching device is above said drop-off position.

3. The case packer of claim 1 wherein said control unit also controls said product-supplying mechanism, temporarily stopping said product-supplying mechanism when said continuous motion of said product-aligning mechanism is started and restarting said product-supplying mechanism such that a next product is delivered from said product-supplying mechanism to an upstream conveyor of said product-aligning mechanism before said continuous motion of said upstream conveyor is switched to said intermittent motion when the portion of said aligned products remaining on said upstream conveyor becomes equal to the distance traveled in one cycle of said intermittent motion.

4. The case packer of claim 1 wherein said packing unit comprises:
   an elongated member rotatable between a first position above a pick-up position where products to be packed are introduced into said packing unit and a second position above a drop-off position where said products are dropped off into a container;
   suction devices at both ends of said elongated member for sucking up said products by a negative pressure and releasing said sucked-up products;
   discharging means for removing products from said pick-up position;
   a pressure sensor for detecting said negative pressure; and
   said control unit serving to detect a suction error by receiving a signal from said pressure sensor and causing said discharging means to remove products from said pick-up position when said suction error is detected.

5. The case packer of claim 1 wherein said product-supplying mechanism and said conveyors of said product-aligning mechanism each comprise a servo mechanism and are controlled by said control unit through said servo mechanism.

6. The case packer of claim 1 wherein said specified number of delivered products overlap mutually one over another to form said group.

7. The case packer of claim 3 wherein said product-supplying mechanism and said conveyors of said product-aligning mechanism each comprise a servo mechanism and are controlled by said control unit through said servo mechanism.

8. A case packer comprising:

a product-supplying mechanism for transporting packaged products sequentially in a downstream direction from an upstream side;

a product-aligning mechanism for receiving products from said product-supplying mechanism and transporting said received products further in said downstream direction, said product-aligning mechanism including an upstream conveyor and a downstream conveyor arranged longitudinally downstream to said upstream conveyor;

a packing unit for receiving products from said product-aligning mechanism and packing a container with said transported products from said product-aligning mechanism; and a control unit for moving said upstream conveyor of said product-aligning mechanism in an intermittent motion every time a product is delivered thereonto so as to sequentially align a specified number of the delivered products thereon to form a group, thereafter moving said upstream conveyor and said downstream conveyor in a continuous motion to thereby transport said group of aligned products in said downstream direction towards said packing unit, and causing said upstream conveyor to switch from said continuous motion to said intermittent motion when said aligned products are discharged therefrom in said downstream direction.

9. The case packer of claim 8 wherein said control unit also controls said product-supplying mechanism, temporarily stopping said product-supplying mechanism when said continuous motion of said upstream conveyor of said product-aligning mechanism is started and restarting said product-supplying mechanism such that a next product is delivered from said product-supplying mechanism to said upstream conveyor of said product-aligning mechanism before said continuous motion of said upstream conveyor is switched to said intermittent motion when the portion of said aligned products remaining on said upstream conveyor becomes equal to the distance traveled in one cycle of said intermittent motion.

10. The case packer of claim 8 wherein said packing unit comprises:

an elongated member rotatable between a first position above a pick-up position where products to be packed are introduced into said packing unit and a second position above a drop-off position where said products are dropped off into a container;

catching devices at both ends of said elongated member for catching and releasing said products; and means for rotating said elongated member horizontally, one of said catching devices being above said pick-up position when the other of said catching devices is above said drop-off position, and said the other catching device being above said pick-up position when said one catching device is above said drop-off position.

11. The case packer of claim 9 wherein said product-supplying mechanism and said conveyors of said product-aligning mechanism each comprise a servo mechanism and are controlled by said control unit through said servo mechanism.

12. The case packer of claim 8 wherein said packing unit comprises:

an elongated member rotatable between a first position above a pick-up position where products to be packed are introduced into said packing unit and a second position above a drop-off position where said products are dropped off into a container;

suction devices at both ends of said elongated member for sucking up said products by a negative pressure and releasing said sucked-up products;

discharging means for removing products from said pick-up position;

a pressure sensor for detecting said negative pressure; and said control unit serving to detect a suction error by receiving a signal from said pressure sensor and causing said discharging means to remove products from said pick-up position when said suction error is detected.

13. The case packer of claim 8 wherein said product-supplying mechanism and said conveyors of said product-aligning mechanism each comprise a servo mechanism and are controlled by said control unit through said servo mechanism.

14. The case packer of claim 8 wherein said specified number of delivered products overlap mutually one over another to form said group.

* * * * *